US011340077B2

(12) United States Patent
Young et al.

(10) Patent No.: US 11,340,077 B2
(45) Date of Patent: May 24, 2022

(54) DRIVING CONDITION SPECIFIC SENSOR QUALITY INDEX

(71) Applicant: HERE Global B.V., Eindhoven (NL)

(72) Inventors: Jeremy M. Young, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 408 days.

(21) Appl. No.: 16/367,746

(22) Filed: Mar. 28, 2019

(65) Prior Publication Data
US 2020/0309533 A1 Oct. 1, 2020

(51) Int. Cl.
*G01C 21/28* (2006.01)
*G01C 21/34* (2006.01)
*G01C 21/36* (2006.01)
*G05D 1/02* (2020.01)

(52) U.S. Cl.
CPC ......... *G01C 21/28* (2013.01); *G01C 21/3415* (2013.01); *G01C 21/3691* (2013.01); *G05D 1/0212* (2013.01); *G05D 2201/0213* (2013.01)

(58) Field of Classification Search
CPC ................ G01C 21/28; G01C 21/3415; G01C 21/3691; G05D 1/0212; G05D 2201/0213
See application file for complete search history.

(56) References Cited

U.S. PATENT DOCUMENTS

| | | |
|---|---|---|
| 9,274,525 B1 | 3/2016 | Ferguson et al. |
| 10,086,844 B2 | 10/2018 | Coelingh et al. |
| 2005/0065711 A1* | 3/2005 | Dahlgren .................. G08G 1/01 701/117 |
| 2008/0224866 A1* | 9/2008 | Rehman ............. G08B 13/2417 340/572.1 |
| 2015/0266490 A1 | 9/2015 | Coelingh et al. |

(Continued)

FOREIGN PATENT DOCUMENTS

| | | |
|---|---|---|
| EP | 3318846 A1 | 5/2018 |
| WO | WO-2009/021477 A2 | 2/2009 |

(Continued)

OTHER PUBLICATIONS

Extended European Search Report for European Application No. 20164554.6 dated Sep. 8, 2020, 12 pages.

(Continued)

*Primary Examiner* — Ig T An
(74) *Attorney, Agent, or Firm* — Alston & Bird LLP

(57) ABSTRACT

A vehicle apparatus, for example, receives map data comprising a sensor quality index table; accesses the sensor quality index table to determine an expected sensor effectiveness of a sensor onboard a vehicle along at least a portion of a planned route based on current and/or expected driving conditions; and responsive to determining that the expected sensor effectiveness for the at least one sensor satisfies a threshold requirement, perform a low sensor quality mitigation function. The vehicle apparatus is onboard the vehicle and is in communication with the sensor onboard the vehicle. The sensor quality index table may be generated by a network apparatus based on a plurality of sensor quality communications, generated by probe apparatuses, that are partitioned based on location and timestamp. Sensor quality index tables may be aggregated to generate driving condition tables.

20 Claims, 9 Drawing Sheets

(56) References Cited

U.S. PATENT DOCUMENTS

| | | |
|---|---|---|
| 2016/0358475 A1 | 12/2016 | Prokhorov |
| 2017/0261974 A1 | 9/2017 | Ebe |
| 2017/0356750 A1 | 12/2017 | Iagnemma |
| 2018/0017396 A1* | 1/2018 | Lynch .................... G01C 21/32 |
| 2018/0211168 A1* | 7/2018 | Khurshudov .......... G06N 5/025 |
| 2018/0328743 A1 | 11/2018 | Sullivan |
| 2019/0118832 A1 | 4/2019 | Mimura et al. |
| 2019/0294167 A1* | 9/2019 | Kutila .................... G06Q 10/04 |

FOREIGN PATENT DOCUMENTS

| | | |
|---|---|---|
| WO | WO-2017/183077 A1 | 10/2017 |
| WO | WO-2018/026603 A1 | 2/2018 |

OTHER PUBLICATIONS

Office Action for European Application No. 20164554.6 dated Sep. 7, 2021, 7 pages.

\* cited by examiner

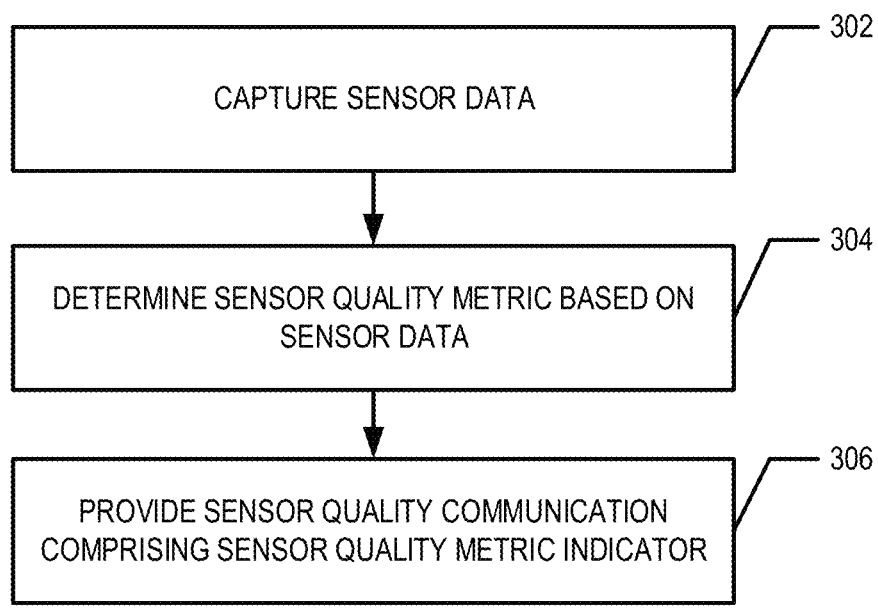

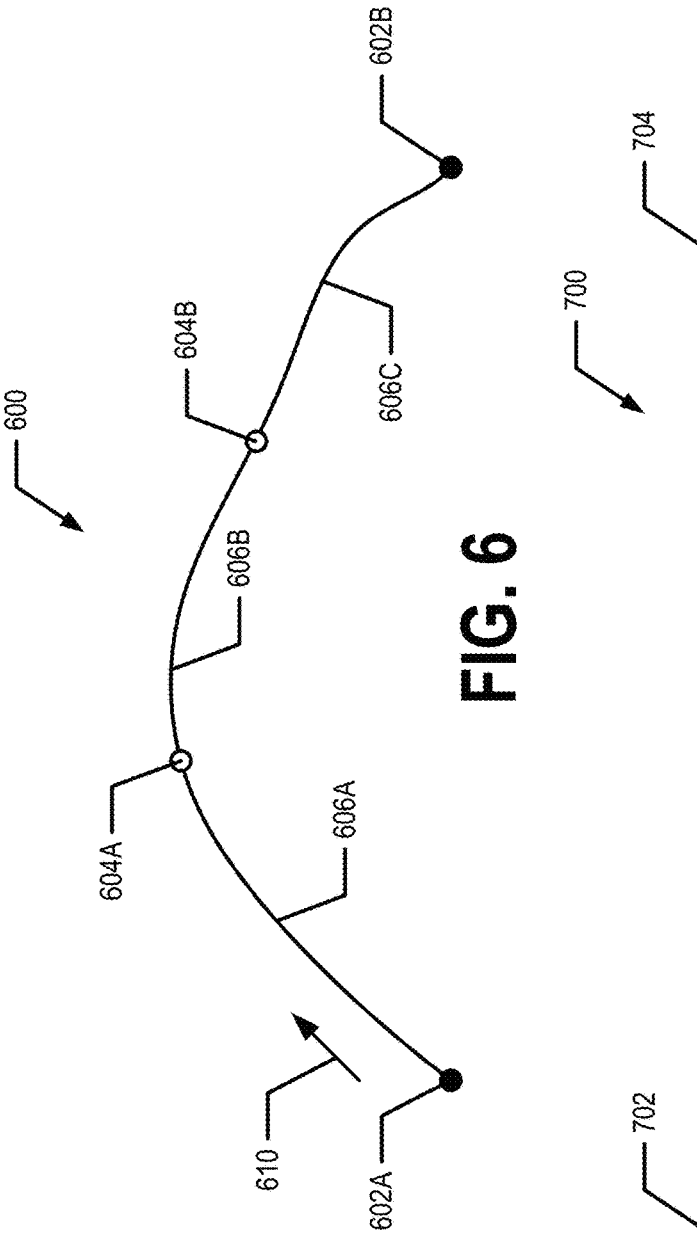

FIG. 6

| Sensor Data | | | | | | Driving Conditions | | | | | |
|---|---|---|---|---|---|---|---|---|---|---|---|
| Sensor ID | Epoch ID | TME ID | Sensor Quality Index | Cloud Cover | Precipitation Type | Precipitation Rate | Visibility | Obstructions to Visibility | Cloud Ceiling | Temperature | Humidity | Traffic Conditions |
| S1 | 6/15/2019 T13:45:30 | L1 | 100% | 0 | null | 0 | 15 km | null | 7620 m | 42F | 63% | light |
| S1 | 6/15/2019 T16:46:23 | L1 | 100% | 0 | null | 0 | 15 km | null | 7535 m | 44F | 60% | moderate |
| S1 | 6/15/2019 T19:52:44 | L1 | 0% | 0 | null | 0 | 15km | null | 7480 m | 44F | 59% | heavy |
| S1 | 6/15/2019 T20:12:10 | L1 | 50% | 0 | null | 0 | 15 km | null | 7420 m | 42F | 59% | heavy |
| S2 | 6/15/2019 T20:12:10 | L1 | 90% | 0 | null | 0 | 15 km | null | 7420 m | 42F | 59% | heavy |

FIG. 7

| Sensor ID | Precipitation Type | Precipitation Rate | Sensor Quality Index |
|---|---|---|---|
| S1 | Snow | < 12.7 mm/hour | 90% |
| S1 | Snow | > 12.7 mm/hour < 25.4 mm/hour | 50% |
| S1 | Snow | > 25.4 mm/hour | 0% |
| S1 | Rain | < 12.7 mm/hour | 75% |
| S1 | Rain | > 12.7 mm/hour < 25.4 mm/hour | 35% |
| S1 | Rain | > 25.4 mm/hour | 0% |

DRIVING CONDITION SPECIFIC SENSOR QUALITY INDEX

TECHNOLOGICAL FIELD

An example embodiment relates generally to a driving condition dependent sensor quality index. An example embodiment relates generally to the determination and use of a driving condition dependent sensor quality index, for example, for assisted or automated driving.

BACKGROUND

Automated, self-driving and highly assisted driving vehicles depend on sensors to determine the location of the vehicle and information regarding the vehicle's surroundings. However, various sensors will have varying degrees of usefulness based on many environmental considerations. A simple example is sun glares or blinding sun around sunset/sunrise in certain directions during certain times of the year. In particular, in various situations sensors are technically working properly, however the environmental condition impedes their capability to sense correctly. This may result in driving situations that are difficult for automated, self-driving vehicles and/or highly assisted driving vehicles to navigate.

BRIEF SUMMARY OF SOME EXAMPLE EMBODIMENTS

Various embodiments provide a technical solution to the technical problem of identifying and mitigating situations wherein various sensors may be technically working properly, but due to driving conditions under which the various sensors are capturing sensor information/data, the various sensors are not functioning effectively. For example, probe apparatuses onboard vehicles traveling through at least a portion of a road network may capture sensor information/data via one or more sensors onboard the corresponding vehicles. The probe apparatuses may determine sensor quality metrics based on the captured sensor information/data, wherein a sensor quality metric indicates a quality, effectiveness of a corresponding sensor, and/or usability of the sensor information/data captured by the corresponding sensor. The probe apparatuses may then provide sensor quality communications comprising sensor quality metrics along with corresponding locations and timestamps indicating the location and date and/or time where the corresponding sensor information/data was captured.

A network apparatus may receive a plurality of sensor quality communications (e.g., generated and provided by one or more probe apparatuses) and partition the corresponding sensor quality metrics into groups based on the corresponding locations and timestamps. For example, a location of a sensor quality communication may be map-matched to a traversable map element (TME). In various embodiments, a TME is a link corresponding to a road segment or a lane corresponding to a travel lane of a road segment. In various embodiments, a link or a lane is defined by a start point and an end point. In an example embodiment, a TME may be a sub-link or sub-lane that is a portion of a link or lane, respectively, that is defined by (a) either the start point of the corresponding link or lane or a start off-set point along the corresponding link or lane and (b) either an end off-set point along the corresponding link or lane or the end point of the corresponding link or lane. In another example, the timestamp may be matched to an epoch, wherein an epoch is a predefined period or window of time that may be defined by a date of the year, day of the week, and/or time of day. Each group of sensor quality metrics is associated with a TME and an epoch.

For each group, the network apparatus may request and receive and/or otherwise access (e.g., via one or more informant apparatuses) various driving condition information/data corresponding to the group. In various embodiments, driving condition information/data corresponding to the group comprises weather information/data, traffic information/data, road position information/data, and/or the like corresponding to the TME and epoch corresponding to the group. In various embodiments, the weather information/data comprises information/data regarding weather conditions along the TME during the epoch corresponding to the group. In various embodiments, the traffic information/data comprises information/data regarding traffic conditions along the TME during the epoch corresponding to the group. In various embodiments, the driving condition information/data indicates a degree of various dynamic factors (e.g., weather conditions, traffic conditions, road position, and/or the like). For example, the weather information/data may indicate type of precipitation and a rate (or range of rate) of precipitation. In another example, the traffic information/data may indicate a level or range of traffic (e.g., volume, representative speed, free flow ratio, incident indicator/information). In various embodiments, the road position information/data may indicate the position of a travel lane across a road segment. For example, the road position information/data may indicate that a TME is a far right lane, a far left lane, a middle lane, and/or the like.

For example group, the network apparatus may determine a sensor quality index for one or more sensor types for the corresponding TME and epoch. In various embodiments, the sensor quality index for a sensor type is determined based on the sensor quality metrics of the group that correspond to sensor information/data captured by sensors of the sensor type. In an example embodiment, the sensor quality index for a sensor type is determined based on a distribution of the sensor quality metrics of the group that correspond to sensor information/data captured by sensors of the sensor type. The sensor quality index may further comprise and/or be associated with at least a portion of corresponding driving condition information/data. A plurality of sensor quality indices corresponding to a TME (e.g., corresponding to a plurality of epochs and/or sensor types) may be aggregated to generate a sensor quality index table corresponding to the TME. In various embodiments, the network apparatus may provide one or more sensor quality index tables such that one or more vehicle apparatuses may receive the sensor quality index tables and use at least a portion thereof for performing one or more navigation functions. In various embodiments, the sensor quality index table may be packaged as part of a digital map. For example, the sensor quality index table may be packaged as part of a digital map tile comprising a data record corresponding to the TME. For example, the digital map tile may provide a representation of the road network in a geographical area comprising the road segment and/or travel lane of the road segment corresponding to the TME. In various embodiments, the network apparatus may provide the digital map and/or digital map tile such that one or more vehicle apparatuses receive the digital map and/or digital map tile comprising the sensor quality index tables and use at least a portion of the sensor quality index tables for performing one or more navigation functions.

In various embodiments, the sensor quality indices may be analyzed to determine a driving condition table. In various embodiments, the sensor quality indices corresponding to a sensor type and corresponding to a plurality of TMEs and/or epochs may be analyzed to determine various driving conditions affect the effectiveness sensors of the sensor type and/or usability of sensor information/data captured by sensors of the sensor type. The determined effectiveness of sensors of the sensor type and/or usability of sensor information/data captured by sensors of the sensor type may be summarized in a driving condition table. In various embodiments, a driving condition table may indicate the effectiveness of sensors of a sensor type and/or usability of sensor information/data captured by sensors of a sensor type for a various degrees of one or more dynamic factors (e.g., weather conditions, traffic conditions, road position, and/or the like). For example, a driving condition table may indicate the effectiveness of sensors of a sensor type and/or usability of sensor information/data captured by sensors of a sensor type for a variety of precipitation types and rates (and/or range of rates). For example, an example driving condition table indicates the effectiveness of sensors of a sensor type and/or usability of sensor information/data captured by sensors of a sensor type for light snow, moderate snow, heavy snow, light rain, moderate rain, and heavy rain. In another example, an example driving condition table indicates the effectiveness of sensors of a sensor type and/or usability of sensor information/data captured by sensors of a sensor type for light traffic with a high free flow ratio (and/or representative speed), light traffic with a moderate free flow ratio (and/or representative speed), moderate traffic with a high free flow ratio (and/or representative speed), moderate traffic with a moderate free flow ratio (and/or representative speed), moderate traffic with a low free flow ratio (and/or representative speed), heavy traffic with a high free flow ratio (and/or representative speed), heavy traffic with a moderate free flow ratio (and/or representative speed), heavy traffic with a low free flow ratio (and/or representative speed), and/or the like. In various embodiments, the network apparatus may provide one or more driving condition tables such that one or more vehicle apparatuses may receive the driving condition tables and use at least a portion thereof for performing one or more navigation functions. In various embodiments, the driving condition table may be packaged as part of a digital map. For example, the driving condition table may be packaged as part of a digital map tile. In various embodiments, the network apparatus may provide the digital map and/or digital map tile such that one or more vehicle apparatuses receive the digital map and/or digital map tile comprising the driving condition tables and use at least a portion of the driving condition tables for performing one or more navigation functions.

In various embodiments, a vehicle apparatus is onboard a vehicle and in communication with one or more sensors onboard the vehicle. In various embodiments, a vehicle apparatus may receive one or more sensor quality index tables, driving condition tables, a digital map and/or digital map tile(s) comprising sensor quality index tables and/or driving condition tables. The vehicle apparatus may then use at least a portion of at least one the sensor quality index tables and/or driving condition tables to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like. For example, the vehicle apparatus may determine and/or receive a planned route for the vehicle to navigate. In an example embodiment, the planned route comprises an origin location, a destination location, a traversable route from the origin location to the destination location, a start time, an expected arrival time, and/or the like. The vehicle apparatus may determine current and/or expected driving conditions (e.g., may request and receive and/or otherwise access, possibly via an information apparatus) along at least a portion of the planned route. The vehicle apparatus may use the current and/or expected driving conditions along at least a portion of the planned route and one or more sensor quality index tables and/or driving condition tables to determine the expected effectiveness of one or more sensors and/or usability of sensor information/data captured by the one or more sensors onboard the vehicle along at least a portion of the planned route (e.g., along one or more TMEs of the traversable route from the origin location to the destination location). The determined expected effectiveness of one or more sensors and/or usability of sensor information/data captured by the one or more sensors onboard the vehicle along the at least a portion of the planned route may be evaluated based on a quality threshold requirement (e.g., compared to a quality threshold that indicates a minimum expected effectiveness and/or usability of a sensor). When it is determined that the expected effectiveness of one or more sensors and/or usability of sensor information/data captured by the one or more sensors onboard the vehicle is acceptable along the at least a portion of the planned route and/or the quality threshold requirement is satisfied (e.g., the expected effectiveness and/or usability is greater than or equal to the quality threshold), the vehicle apparatus may proceed to driving the vehicle along the planned route in an automated driving fashion, assisting in the driving of the vehicle along the planned route, and/or guiding a human operator to drive the vehicle along the planned route. When it is determined that the expected effectiveness of one or more sensors and/or usability of sensor information/data captured by the one or more sensors onboard the vehicle is not acceptable along the at least a portion of the planned route and/or the quality threshold requirement is not satisfied (e.g., the expected effectiveness and/or usability is less than the quality threshold), the vehicle apparatus may perform one or more low sensor quality mitigation functions. In various embodiments, a low sensor quality mitigation function may comprise determining a new route from the origin location to the destination location wherein the entirety of the new route (and/or a larger portion of the new route compared to the planned route) has expected sensor effectiveness and/or usability that is acceptable (e.g., satisfies the threshold requirement); determining a modified sensor usage plan (e.g., adjusting one or more weights assigned to sensor information/data captured by one or more sensors onboard the vehicle in one or more algorithms that use sensor information/data to perform navigation functions) for one or more portions of the route (e.g., the planned route or a new route); identify a human operator assistance portion of a route (e.g., the planned route or a new route); activating one or more secondary sensors; and/or the like. In various embodiments, a human operator of the vehicle may be provided with a notification that the vehicle is approaching the human operator assistance portion of the route prior to the vehicle reaching the human operator assistance portion (e.g., one minute, five minutes, ten minutes, fifteen minutes, quarter of a mile, half a mile, one mile, five miles, half a kilometer, a kilometer, five kilometers, ten kilometers, fifteen kilometers, and/or the like before the vehicle reaches the human operator assistance portion). The vehicle apparatus may then transfer control of the vehicle to the human operator through the human operator assistance portion of the route and, in an example embodiment, offer to and/or to automatically resume control and/or assisting to control the vehicle once the vehicle exits and/or completes the human operator assistance portion of the route. Various other low sensor quality mitigation functions and/or combinations of determining a new route, determining a modified sensor usage plan, a human operator assistance portion, activating one or more secondary sensors, and/or other low sensor quality mitigation functions may be used, in various embodiments.

In an example embodiment, map data comprising at least one sensor quality index table is received by a vehicle apparatus. The vehicle apparatus is (a) onboard a vehicle, (b) in communication with a plurality of sensors onboard the vehicle, and (c) comprises a processor, a memory, and a communication interface configured to communicate via at least one network. The at least one sensor quality index table is accessed by the vehicle apparatus to determine an expected sensor effectiveness of at least one sensor of the plurality of sensors onboard the vehicle along at least a portion of a planned route based on current and/or expected driving conditions. Responsive to determining that the expected sensor effectiveness for the at least one sensor satisfies a threshold requirement, the vehicle apparatus performs a low sensor quality mitigation function.

According to a first aspect of the present invention, a method is provided. In an example embodiment, the method comprises receiving map data comprising at least one sensor quality index table by a vehicle apparatus. The vehicle apparatus is (a) onboard a vehicle, (b) in communication with a plurality of sensors onboard the vehicle, and (c) comprises a processor, a memory, and a communication interface configured to communicate via at least one network. The method further comprises accessing the at least one sensor quality index table, by the vehicle apparatus, to determine an expected sensor effectiveness of at least one sensor of the plurality of sensors onboard the vehicle along at least a portion of a planned route based on current and/or expected driving conditions. The method further comprises, responsive to determining that the expected sensor effectiveness for the at least one sensor satisfies a threshold requirement, performing a low sensor quality mitigation function.

In an example embodiment, the map data comprises at least one driving condition table and the at least one driving condition table is accessed to determine the expected sensor effectiveness of the at least one sensor. In an example embodiment, the low sensor quality mitigation function comprises determining or requesting a new route that is different from the planned route by at least one TME. In an example embodiment, the low sensor quality mitigation function comprises modifying the usage of the at least one sensor of the plurality of sensors along at least a portion of the planned route. In an example embodiment, modifying the usage of the at least one sensor comprises changing one or more weights in a sensor usage algorithm. In an example embodiment, the low sensor quality mitigation function comprises identifying at least one human operator assistance portion of the planned route. In an example embodiment, the method further comprises providing a human operator perceivable notification that the planned route comprises a human operator assistance portion a set distance or time before the vehicle is expected to reach the human operator assistance portion. In an example embodiment, the method further comprises, responsive to determining that the vehicle has finished traversing the human operator assistance portion, providing a notification that the vehicle has finished traversing the human operator assistance portion. In an example embodiment, the method further comprises determining current and/or expected driving conditions corresponding to at least a portion of the planned route, the current and/or expected driving conditions comprising at least one of current and/or expected weather conditions, traffic conditions, or road position.

According to another aspect of the present invention, a vehicle apparatus is provided. In an example embodiment, the vehicle apparatus comprises at least one processor, a communications interface configured for communicating via at least one network, and at least one memory storing computer program code. The vehicle apparatus is onboard a vehicle and in communication with a plurality of sensors onboard the vehicle. The at least one memory and the computer program code are configured to, with the processor, cause the vehicle apparatus to at least receive map data comprising at least one sensor quality index table; access the at least one sensor quality index table to determine an expected sensor effectiveness of at least one sensor of the plurality of sensors onboard the vehicle along at least a portion of a planned route based on current and/or expected driving conditions; and, responsive to determining that the expected sensor effectiveness for the at least one sensor satisfies a threshold requirement, perform a low sensor quality mitigation function.

In an example embodiment, the map data comprises at least one driving condition table and the at least one driving condition table is accessed to determine the expected sensor effectiveness of the at least one sensor. In an example embodiment, the low sensor quality mitigation function comprises determining or requesting a new route that is different from the planned route by at least one TME. In an example embodiment, the low sensor quality mitigation function comprises modifying the usage of the at least one sensor of the plurality of sensors along at least a portion of the planned route. In an example embodiment, modifying the usage of the at least one sensor comprises changing one or more weights in a sensor usage algorithm. In an example embodiment, the low sensor quality mitigation function comprises identifying at least one human operator assistance portion of the planned route. In an example embodiment, the at least one memory and the computer program code are further configured to, with the processor, cause the vehicle apparatus to at least provide a human operator perceivable notification that the planned route comprises a human operator assistance portion a set distance or time before the vehicle is expected to reach the human operator assistance portion. In an example embodiment, the at least one memory and the computer program code are further configured to, with the processor, cause the vehicle apparatus to at least, responsive to determining that the vehicle has finished traversing the human operator assistance portion, provide a notification that the vehicle has finished traversing the human operator assistance portion. In an example embodiment, the at least one memory and the computer program code are further configured to, with the processor, cause the vehicle apparatus to at least determine current and/or expected driving conditions corresponding to at least a portion of the planned route, the current and/or expected driving conditions comprising at least one of current and/or expected weather conditions, traffic conditions, or road position.

In still another aspect of the present invention, a computer program product is provided. In an example embodiment, the computer program product comprises at least one non-transitory computer-readable storage medium having computer-readable program code portions stored therein. The computer-readable program code portions comprise executable portions configured, when executed by a processor of a vehicle apparatus onboard a vehicle, to cause the vehicle apparatus to receive map data comprising at least one sensor quality index table; access the at least one sensor quality index table to determine an expected sensor effectiveness a sensor along at least a portion of a planned route based on current and/or expected driving conditions, the sensor being one of a plurality of sensors onboard the vehicle and in communication with the apparatus; and responsive to determining that the expected sensor effectiveness for the at least one sensor satisfies a threshold requirement, perform a low sensor quality mitigation function.

In an example embodiment, the map data comprises at least one driving condition table and the at least one driving condition table is accessed to determine the expected sensor effectiveness of the at least one sensor. In an example embodiment, the low sensor quality mitigation function comprises determining or requesting a new route that is different from the planned route by at least one TME. In an example embodiment, the low sensor quality mitigation function comprises modifying the usage of the at least one sensor of the plurality of sensors along at least a portion of the planned route. In an example embodiment, modifying the usage of the at least one sensor comprises changing one or more weights in a sensor usage algorithm. In an example embodiment, the low sensor quality mitigation function comprises identifying at least one human operator assistance portion of the planned route. In an example embodiment, the computer-readable program code portions further comprise executable portions configured, when executed by a processor of a vehicle apparatus onboard a vehicle, to cause the vehicle apparatus to provide a human operator perceivable notification that the planned route comprises a human operator assistance portion a set distance or time before the vehicle is expected to reach the human operator assistance portion. In an example embodiment, the computer-readable program code portions further comprise executable portions configured, when executed by a processor of a vehicle apparatus onboard a vehicle, to cause the vehicle apparatus to, responsive to determining that the vehicle has finished traversing the human operator assistance portion, provide a notification that the vehicle has finished traversing the human operator assistance portion. In an example embodiment, the computer-readable program code portions further comprise executable portions configured, when executed by a processor of a vehicle apparatus onboard a vehicle, to cause the vehicle apparatus to determine current and/or expected driving conditions corresponding to at least a portion of the planned route, the current and/or expected driving conditions comprising at least one of current and/or expected weather conditions, traffic conditions, or road position.

According to yet another aspect of the present invention, a vehicle apparatus is provided. In an example embodiment, the vehicle apparatus is (a) onboard a vehicle, (b) in communication with a plurality of sensors onboard the vehicle, and (c) comprises a processor, a memory, and a communication interface configured to communicate via at least one network. In an example embodiment, the apparatus comprises means for receiving map data comprising at least one sensor quality index table by a vehicle apparatus. In an example embodiment, the vehicle apparatus comprises means for accessing the at least one sensor quality index table, by the vehicle apparatus, to determine an expected sensor effectiveness of at least one sensor of the plurality of sensors onboard the vehicle along at least a portion of a planned route based on current and/or expected driving conditions. In an example embodiment, the vehicle apparatus comprises means for, responsive to determining that the expected sensor effectiveness for the at least one sensor satisfies a threshold requirement, performing a low sensor quality mitigation function.

In an example embodiment, a network apparatus receives a plurality of sensor quality communications. Each sensor quality communication comprises a location, a timestamp, and a sensor quality metric. The network apparatus comprises a processor, a memory, and a communication interface configured to communicate via at least one network. The network apparatus partitions the sensor quality metrics of each of the plurality of sensor quality communications into groups based on the corresponding location and timestamp. The network apparatus determines a sensor quality index based on the corresponding sensor quality metrics for at least one group of the groups. The network apparatus associates the sensor quality index with (a) a TME based on the corresponding locations and (b) an epoch based on the corresponding timestamps. The network apparatus generates or updates a sensor quality index table based at least in part on the sensor quality index and the corresponding TME and epoch. The network apparatus provides the sensor quality index table such that at least one vehicle apparatus receives the sensor quality index table. The at least one vehicle apparatus is configured to use the sensor quality index table to perform at least one navigation function.

According to an aspect of the present invention, a method is provided. In an example embodiment, the method comprises receiving, by a network apparatus, a plurality of sensor quality communications. Each sensor quality communication comprises a location, a timestamp, and a sensor quality metric. The network apparatus comprises a processor, a memory, and a communication interface configured to communicate via at least one network. The method further comprises partitioning, by the network apparatus, the sensor quality metrics of each of the plurality of sensor quality communications into groups based on the corresponding location and timestamp; for at least one group of the groups, determining, by the network apparatus, a sensor quality index based on the corresponding sensor quality metrics; associating, by the network apparatus, the sensor quality index with (a) a TME based on the corresponding locations and (b) an epoch based on the corresponding timestamps; generating or updating, by the network apparatus, a sensor quality index table based at least in part on the sensor quality index and the corresponding TME and epoch; and providing, by the network apparatus, the sensor quality index table such that at least one vehicle apparatus receives the sensor quality index table. The at least one vehicle apparatus is configured to use the sensor quality index table to perform at least one navigation function.

In an example embodiment, the method further comprises determining driving conditions corresponding to each group, wherein the sensor quality index table provides driving conditions corresponding to the sensor quality index of each group. In an example embodiment, the driving conditions describe a degree to which one or more dynamic factors were present along the TME during the epoch. In an example embodiment, the one or more dynamic factors comprise at least one of weather information, traffic information, or road position. In an example embodiment, the weather information comprises at least one of precipitation type, precipitation rate, cloud cover, visibility, obstructions to visibility, temperature, humidity, cloud ceiling, or part of day indicator corresponding to the TME during the epoch. In an example embodiment, the traffic information comprises at least one of a traffic volume, representative speed, or free flow ratio along the TME during the epoch. In an example embodiment, the method further comprises determining a sensor quality metric distribution for at least one group, the at least one group corresponding to a first TME and first epoch; determining whether the sensor quality metric distribution is unimodal; responsive to determining that the sensor quality metric distribution is unimodal, determining a sensor quality index corresponding to an entire length of the first TME; and responsive to determining that the sensor quality metric distribution is not unimodal, determining one or more offset points along the first TME that define two or more sub-TMEs, each sub-TME corresponding to a unimodal sensor quality metric distribution, and determining a sensor quality index corresponding to each sub-TME, wherein the sensor quality index table is generated or updated to include the sensor quality index corresponding to each sub-TME for the first epoch.

In an example embodiment, a TME is a link corresponding to a road segment of a road network or a lane corresponding to a travel lane of the road segment of the road network. In an example embodiment, the method further comprises storing the sensor quality index table in or in association with a data record corresponding to a TME corresponding to the sensor quality index table, the data record corresponding to the TME being part of a geographic database of a digital map or a tile of the digital map. In an example embodiment, providing the sensor quality index table comprises providing map data of at least a portion of the digital map, the map data comprising the data record corresponding to the TME. In an example embodiment, the method further comprises aggregating one or more sensor quality index tables based on driving conditions to generate one or more driving condition tables; and providing at least one of the one or more driving condition tables such that the at least one vehicle apparatus receives the at least one of the one or more driving condition tables, wherein the at least one vehicle apparatus is configured to use the at least one of the one or more driving condition tables to perform one or more navigation functions. In an example embodiment, the at least one of the one or more driving conditions tables is provided as part of map data of a digital map or a tile of the digital map.

According to another aspect of the present invention, a network apparatus is provided. In an example embodiment, the network apparatus comprises at least one processor, a communications interface configured for communicating via at least one network, and at least one memory storing computer program code. The at least one memory and the computer program code are configured to, with the processor, cause the network apparatus to at least receive a plurality of sensor quality communications, each sensor quality communication comprising a location, a timestamp, and a sensor quality metric; partition the sensor quality metrics of each of the plurality of sensor quality communications into groups based on the corresponding location and timestamp; for at least one group of the groups, determine a sensor quality index based on the corresponding sensor quality metrics; associate the sensor quality index with (a) a TME based on the corresponding locations and (b) an epoch based on the corresponding timestamps; generate or updating a sensor quality index table based at least in part on the sensor quality index and the corresponding TME and epoch; and provide the sensor quality index table such that at least one vehicle apparatus receives the sensor quality index table. The at least one vehicle apparatus is configured to use the sensor quality index table to perform at least one navigation function.

In an example embodiment, the at least one memory and the computer program code are further configured to, with the processor, cause the network apparatus to at least determine driving conditions corresponding to each group, wherein the sensor quality index table provides driving conditions corresponding to the sensor quality index of each group. In an example embodiment, the driving conditions describe a degree to which one or more dynamic factors were present along the TME during the epoch. In an example embodiment, the one or more dynamic factors comprise at least one of weather information, traffic information, or road position. In an example embodiment, the weather information comprises at least one of precipitation type, precipitation rate, cloud cover, visibility, obstructions to visibility, temperature, humidity, cloud ceiling, or part of day indicator corresponding to the TME during the epoch. In an example embodiment, the traffic information comprises at least one of a traffic volume, representative speed, or free flow ratio along the TME during the epoch. In an example embodiment, the at least one memory and the computer program code are further configured to, with the processor, cause the network apparatus to at least determine a sensor quality metric distribution for at least one group, the at least one group corresponding to a first TME and first epoch; determine whether the sensor quality metric distribution is unimodal; responsive to determining that the sensor quality metric distribution is unimodal, determine a sensor quality index corresponding to an entire length of the first TME; and responsive to determining that the sensor quality metric distribution is not unimodal, determine one or more offset points along the first TME that define two or more sub-TMEs, each sub-TME corresponding to a unimodal sensor quality metric distribution, and determine a sensor quality index corresponding to each sub-TME, wherein the sensor quality index table is generated or updated to include the sensor quality index corresponding to each sub-TME for the first epoch.

In an example embodiment, a TME is a link corresponding to a road segment of a road network or a lane corresponding to a travel lane of the road segment of the road network. In an example embodiment, the at least one memory and the computer program code are further configured to, with the processor, cause the network apparatus to at least store the sensor quality index table in or in association with a data record corresponding to a TME corresponding to the sensor quality index table, the data record corresponding to the TME being part of a geographic database of a digital map or a tile of the digital map. In an example embodiment, providing the sensor quality index table comprises providing map data of at least a portion of the digital map, the map data comprising the data record corresponding to the TME. In an example embodiment, the at least one memory and the computer program code are further configured to, with the processor, cause the network apparatus to at least aggregate one or more sensor quality index tables based on driving conditions to generate one or more driving condition tables; and provide at least one of the one or more driving condition tables such that the at least one vehicle apparatus receives the at least one of the one or more driving condition tables, wherein the at least one vehicle apparatus is configured to use the at least one of the one or more driving condition tables to perform one or more navigation functions. In an example embodiment, the at least one of the one or more driving conditions tables is provided as part of map data of a digital map or a tile of the digital map.

According to still another aspect of the present invention, a computer program product is provided. In an example embodiment, the computer program product comprises at least one non-transitory computer-readable storage medium having computer-readable program code portions stored therein. The computer-readable program code portions comprise executable portions configured, when executed by a processor of a network apparatus, to cause the network apparatus to receive a plurality of sensor quality communications, each sensor quality communication comprising a location, a timestamp, and a sensor quality metric; partition the sensor quality metrics of each of the plurality of sensor quality communications into groups based on the corresponding location and timestamp; for at least one group of the groups, determine a sensor quality index based on the corresponding sensor quality metrics; associate the sensor quality index with (a) a TME based on the corresponding locations and (b) an epoch based on the corresponding timestamps; generate or updating a sensor quality index table based at least in part on the sensor quality index and the corresponding TME and epoch; and provide the sensor quality index table such that at least one vehicle apparatus receives the sensor quality index table. The at least one vehicle apparatus is configured to use the sensor quality index table to perform at least one navigation function.

In an example embodiment, the computer-readable program code portions further comprise executable portions configured, when executed by a processor of a network apparatus, to cause the network apparatus to determine driving conditions corresponding to each group, wherein the sensor quality index table provides driving conditions corresponding to the sensor quality index of each group. In an example embodiment, the driving conditions describe a degree to which one or more dynamic factors were present along the TME during the epoch. In an example embodiment, the one or more dynamic factors comprise at least one of weather information, traffic information, or road position. In an example embodiment, the weather information comprises at least one of precipitation type, precipitation rate, cloud cover, visibility, obstructions to visibility, temperature, humidity, cloud ceiling, or part of day indicator corresponding to the TME during the epoch. In an example embodiment, the traffic information comprises at least one of a traffic volume, representative speed, or free flow ratio along the TME during the epoch. In an example embodiment, the computer-readable program code portions further comprise executable portions configured, when executed by a processor of a network apparatus, to cause the network apparatus to determine a sensor quality metric distribution for at least one group, the at least one group corresponding to a first TME and first epoch; determine whether the sensor quality metric distribution is unimodal; responsive to determining that the sensor quality metric distribution is unimodal, determine a sensor quality index corresponding to an entire length of the first TME; and responsive to determining that the sensor quality metric distribution is not unimodal, determine one or more offset points along the first TME that define two or more sub-TMEs, each sub-TME corresponding to a unimodal sensor quality metric distribution, and determine a sensor quality index corresponding to each sub-TME, wherein the sensor quality index table is generated or updated to include the sensor quality index corresponding to each sub-TME for the first epoch.

In an example embodiment, a TME is a link corresponding to a road segment of a road network or a lane corresponding to a travel lane of the road segment of the road network. In an example embodiment, the computer-readable program code portions further comprise executable portions configured, when executed by a processor of a network apparatus, to cause the network apparatus to store the sensor quality index table in or in association with a data record corresponding to a TME corresponding to the sensor quality index table, the data record corresponding to the TME being part of a geographic database of a digital map or a tile of the digital map. In an example embodiment, providing the sensor quality index table comprises providing map data of at least a portion of the digital map, the map data comprising the data record corresponding to the TME. In an example embodiment, the computer-readable program code portions further comprise executable portions configured, when executed by a processor of a network apparatus, to cause the network apparatus to aggregate one or more sensor quality index tables based on driving conditions to generate one or more driving condition tables; and provide at least one of the one or more driving condition tables such that the at least one vehicle apparatus receives the at least one of the one or more driving condition tables, wherein the at least one vehicle apparatus is configured to use the at least one of the one or more driving condition tables to perform one or more navigation functions. In an example embodiment, the at least one of the one or more driving conditions tables is provided as part of map data of a digital map or a tile of the digital map.

According to yet another aspect of the present invention, a network apparatus is provided. In an example embodiment, the network apparatus comprises a processor, a memory, and a communication interface configured to communicate via at least one network. In an example embodiment, the network apparatus comprises means for receiving a plurality of sensor quality communications. Each sensor quality communication comprises a location, a timestamp, and a sensor quality metric. The network apparatus comprises means for partitioning the sensor quality metrics of each of the plurality of sensor quality communications into groups based on the corresponding location and timestamp. The network apparatus comprises means for, for at least one group of the groups, determining a sensor quality index based on the corresponding sensor quality metrics. The network apparatus comprises means for associating the sensor quality index with (a) a TME based on the corresponding locations and (b) an epoch based on the corresponding timestamps. The network apparatus comprises means for generating or updating a sensor quality index table based at least in part on the sensor quality index and the corresponding TME and epoch. The network apparatus comprises means for providing the sensor quality index table such that at least one vehicle apparatus receives the sensor quality index table. The at least one vehicle apparatus is configured to use the sensor quality index table to perform at least one navigation function.

According to yet another aspect of the present invention, a component of an apparatus is provided. In an example embodiment, the component comprises a computer-readable medium. In an example embodiment, the component comprises a digital map stored on the computer-readable medium. The digital map comprises a first plurality of data records. Each of the first plurality of data records represents a corresponding TME. At least some of the first plurality of data records further comprise at least one sensor quality index table. The at least one sensor quality index table provides a sensor quality index for at least one sensor type for each of a plurality of driving conditions. A vehicle comprises a sensor of the at least one sensor type and the sensor quality index indicates an expected sensor effectiveness of the sensor of the at least one sensor type under a corresponding driving condition of the plurality of driving conditions.

In an example embodiment, the apparatus is a vehicle apparatus onboard the vehicle. In an example embodiment, the plurality of driving conditions comprise a precipitation type and a precipitation rate. In an example embodiment, at least some of the plurality of driving conditions correspond to a date or a period of time. In an example embodiment, the plurality of driving conditions comprise at least one of visibility, obstructions to visibility, cloud cover, cloud ceiling, humidity, or temperature. In an example embodiment, the plurality of driving conditions comprise traffic conditions. In an example embodiment, the traffic conditions indicate at least one of a volume of traffic, a representative speed of traffic, or a free flow ratio. In an example embodiment, wherein the driving conditions comprise a road position configured to indicate a position of a travel lane of a road segment with respect to other travel lanes of the road segment. In an example embodiment, the plurality of driving conditions correspond to a degree factor of a particular driving condition. In an example embodiment, the TME corresponding to a first data record of the first plurality of data records is a link corresponding to a road segment or a lane corresponding to a travel lane of the road segment. In an example embodiment, the TME corresponding to a first data record of the first plurality of data records is a sub-link corresponding to a portion of a road segment or a sub-lane corresponding to a portion of a travel lane of the road segment. In an example embodiment, the digital map further comprises at least one driving condition table. In an example embodiment, the at least one driving condition table provides a sensor quality index corresponding to expected sensor effectiveness of a sensor corresponding to a sensor type under an indicated combination of driving conditions. In an example embodiment, the at least one driving condition table is an aggregate of elements of the at least one sensor quality index table.

BRIEF DESCRIPTION OF THE DRAWINGS

Figure 1:
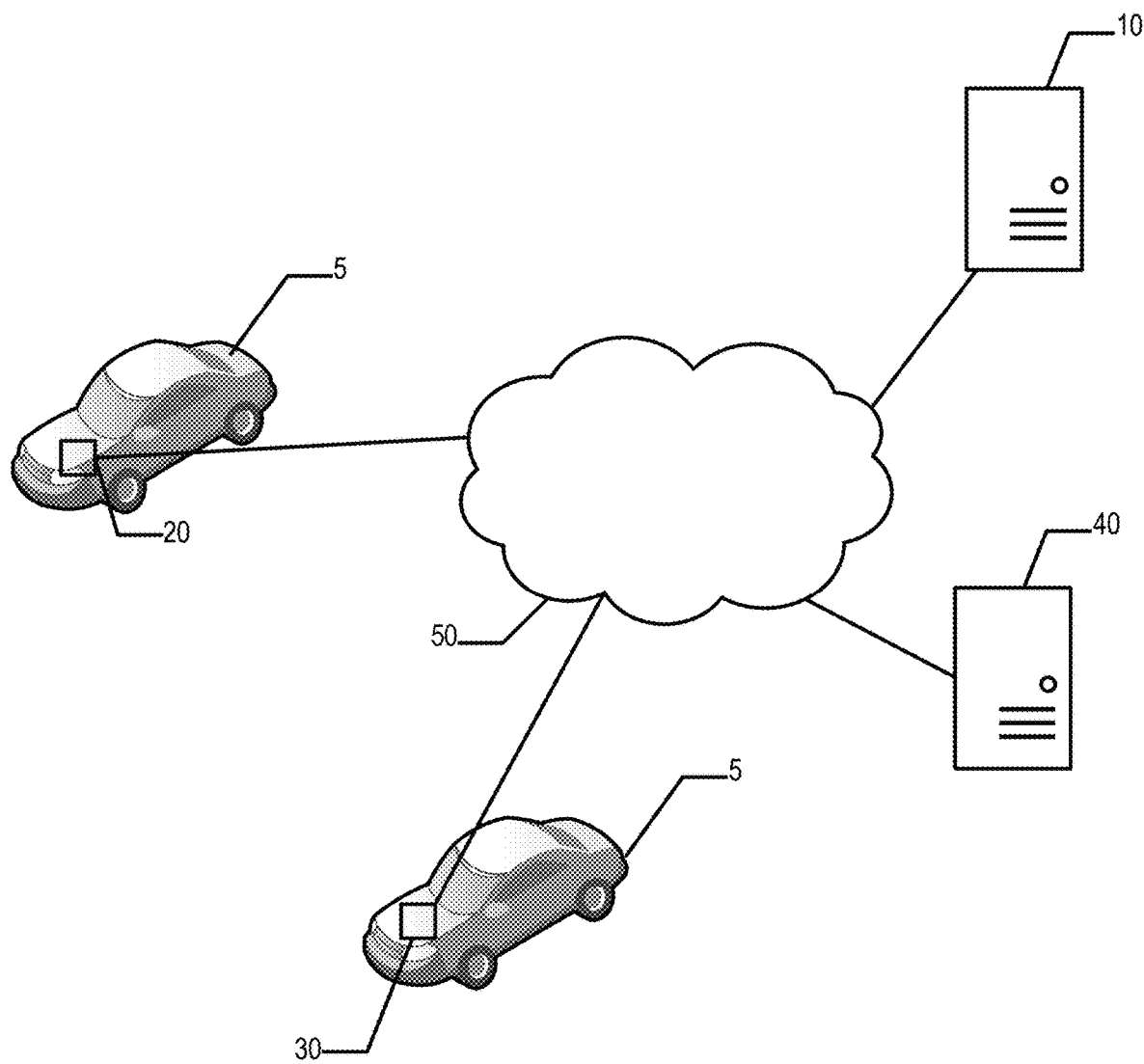
Figure 2A:
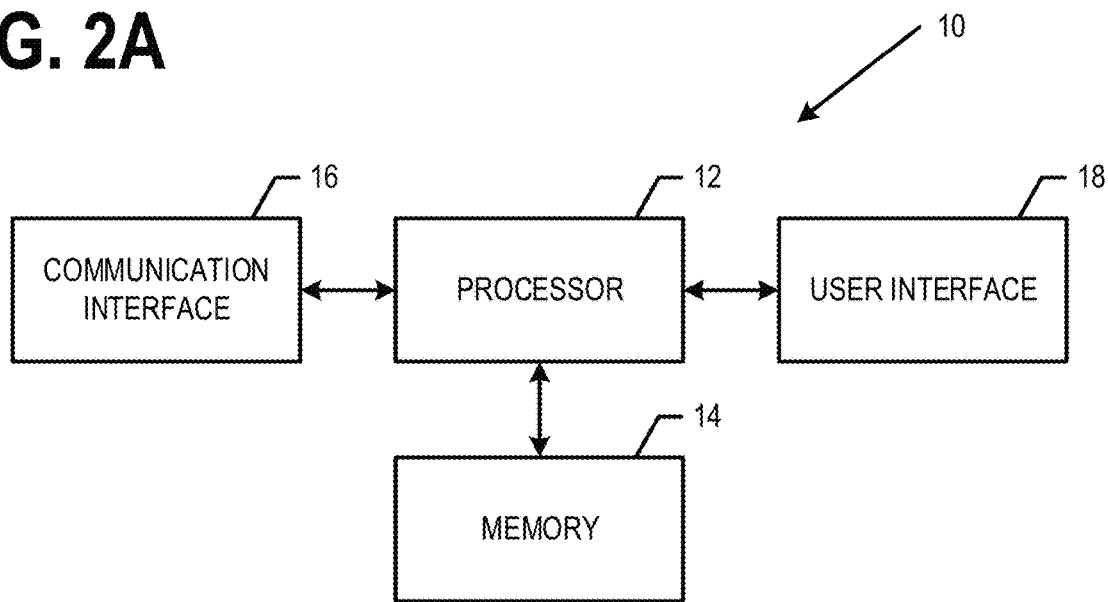
Figure 2B:
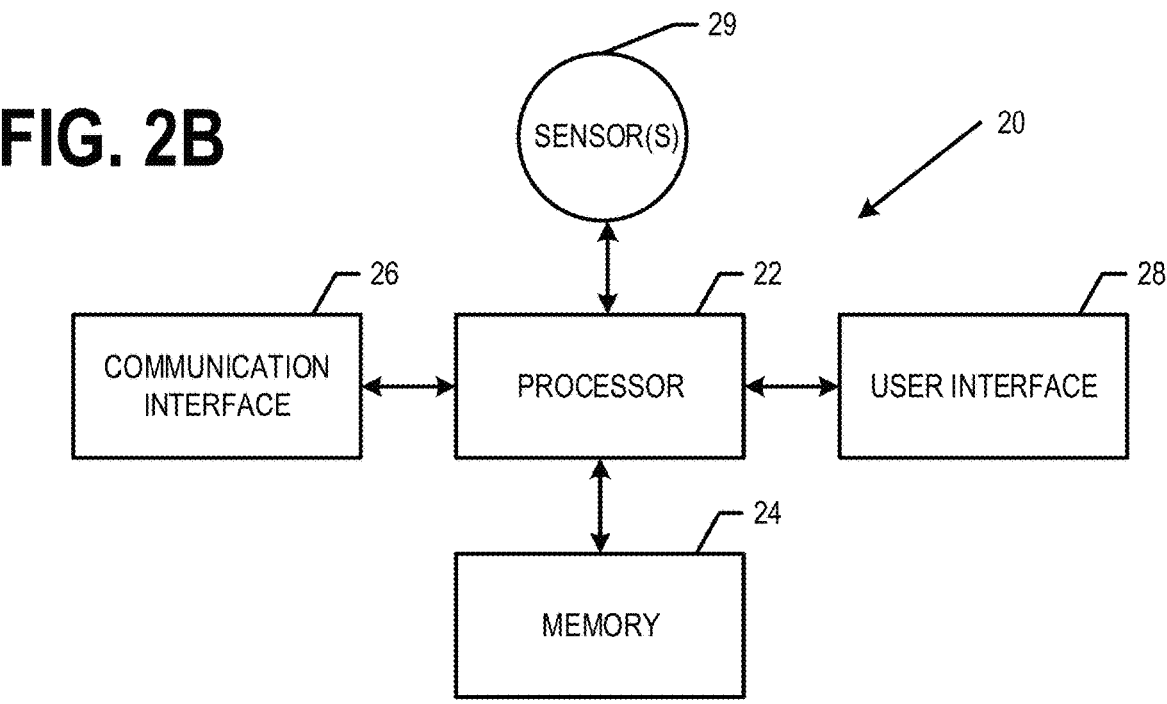
Figure 2C:
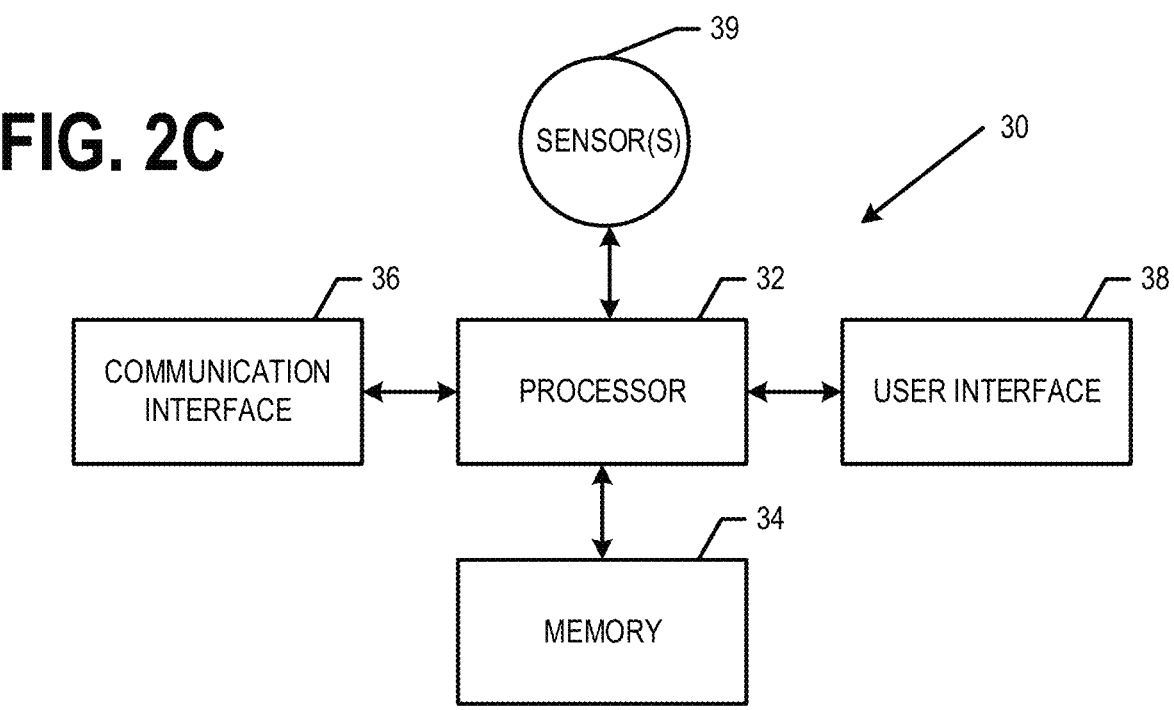
Figure 4A:
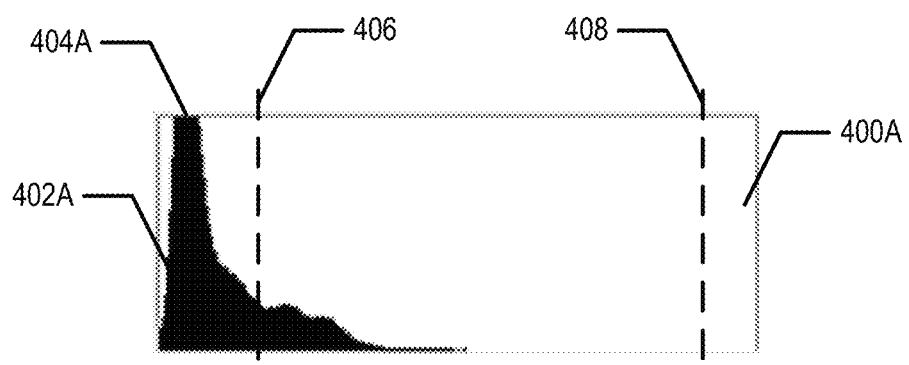
Figure 4B:
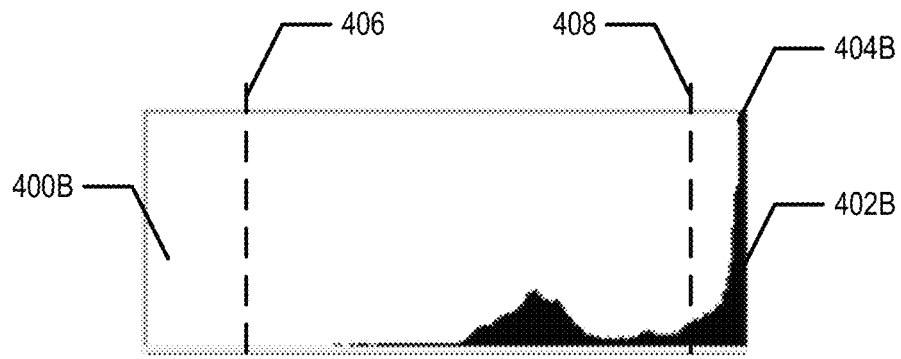
Figure 4C:
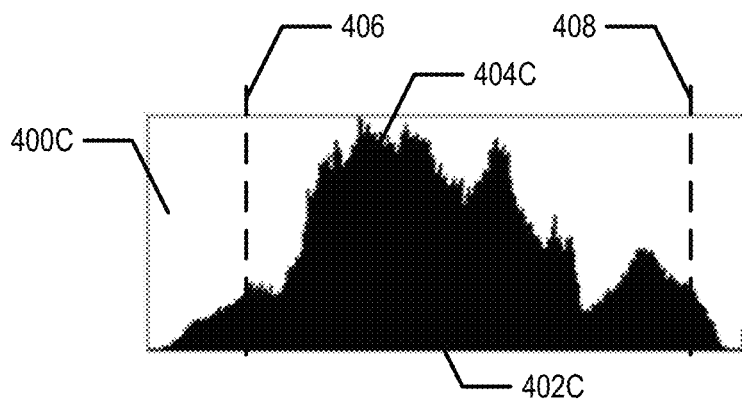
Figure 5:
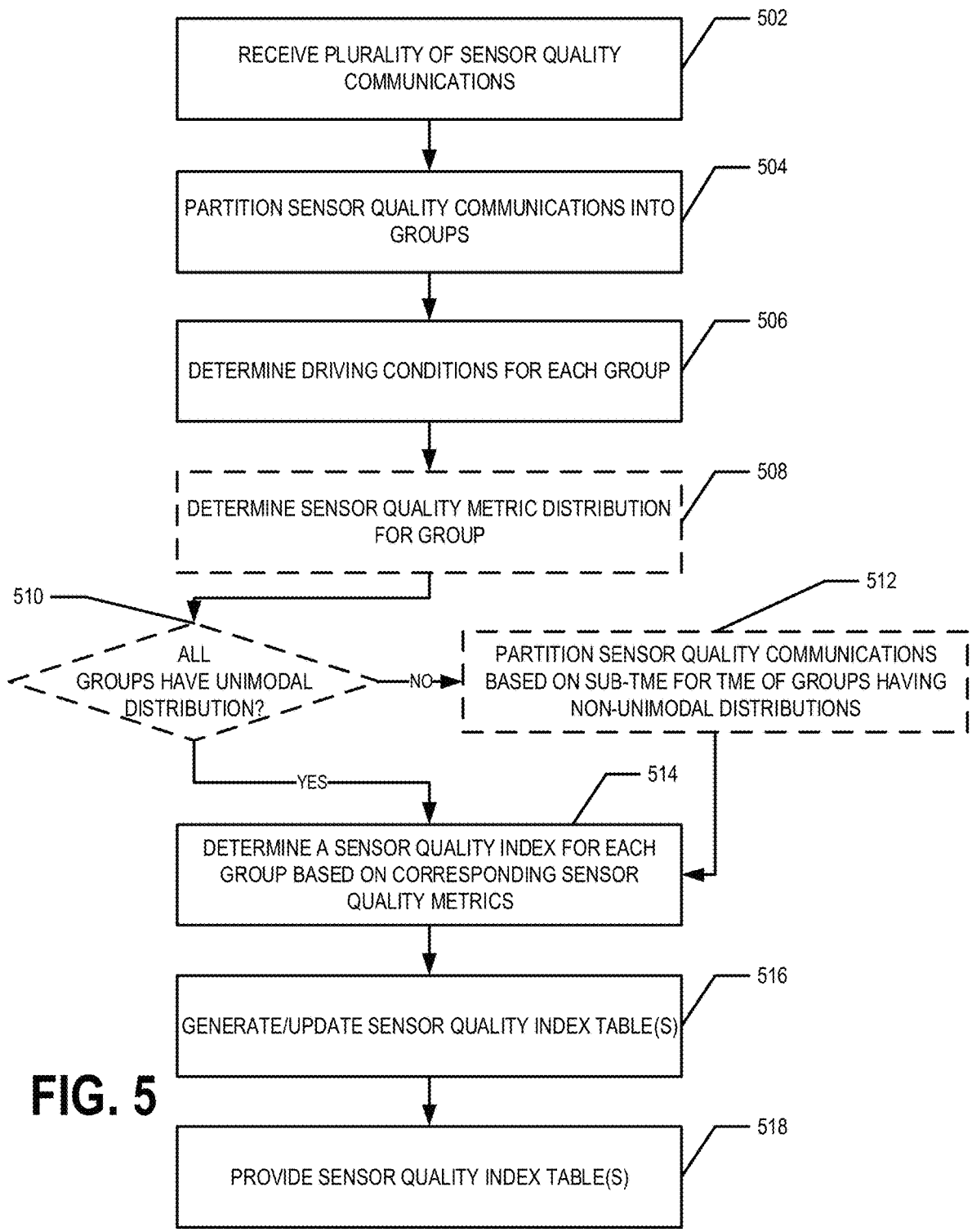
Figure 8:
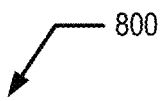
Figure 9:
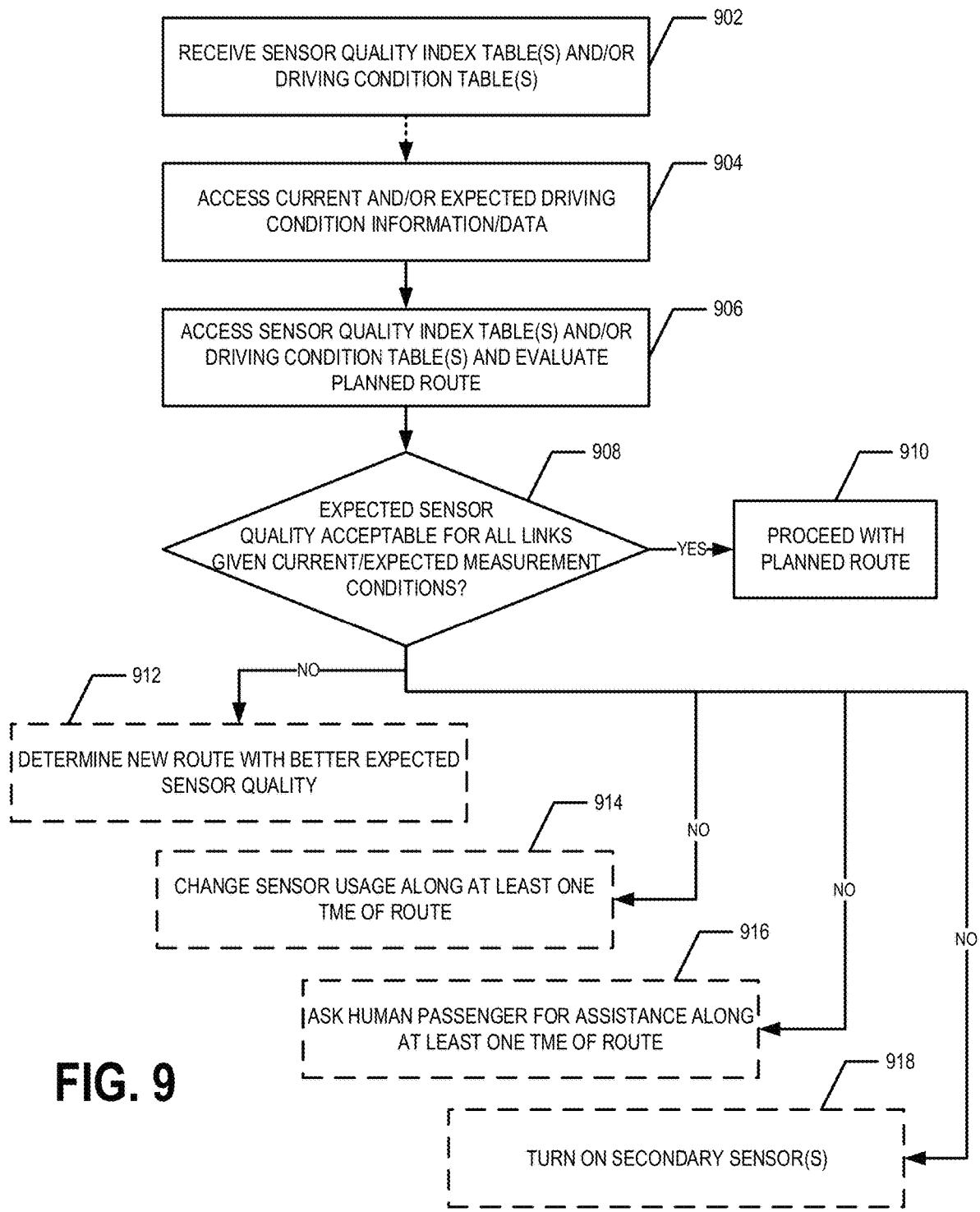

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a probe apparatus that may be specifically configured in accordance with an example embodiment;

FIG. 2C is a block diagram of a vehicle apparatus that may be specifically configured in accordance with an example embodiment;

FIG. 3 is a flowchart illustrating operations performed, such as by the probe apparatus of FIG. 2B to provide a sensor quality communication, in accordance with an example embodiment;

FIG. 4A illustrates an example histogram of an instance of image sensor information/data that is underexposed;

FIG. 4B illustrates an example histogram of an instance of image sensor information/data that is overexposed;

FIG. 4C illustrates an example histogram of an instance of image sensor information/data that is balanced;

FIG. 5 is a flowchart illustrating operations performed, such as by the network apparatus of FIG. 2A to generate and provide a sensor quality index table, in accordance with an example embodiment;

FIG. 6 is an example of a TME that has been divided into three sub-TMEs, in accordance with an example embodiment;

FIG. 7 is an example portion of a sensor quality index table, in accordance with an example embodiment;

FIG. 8 is an example driving condition table corresponding to precipitation type and rate, in accordance with an example embodiment; and FIG. 9 is a flowchart illustrating operations performed, such as by the vehicle apparatus of FIG. 2C to use sensor quality index table(s) and/or driving condition table(s) to perform a navigation function, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, and computer program products are provided in accordance with an example embodiment in order to identify and mitigate situations wherein various sensors may be technically working properly, but due to driving conditions under which the various sensors are capturing sensor information/data, the various sensors are not functioning effectively. For example, vehicles, especially vehicles capable highly assisted and/or automated, self-driving, comprise a plurality of sensors. For example, a vehicle may comprise various sensors such as a Global Navigation Satellite System (GNSS) sensor (e.g., a global positioning system (GPS) sensor), one or more visual imaging sensors (e.g., cameras), radar, lidar, thermal sensors, ultrasonic sensors, electromagnetic sensors, and/or the like. However, under various circumstances various sensors may be technically functioning properly, but may provide usable sensor information/data. For example, the usefulness of lidar during heavy precipitation events (e.g., heavy snowfall, sleet/hail storms, or heavy rains) may be significantly reduced. In another example, when approaching a tunnel or other perpendicular wall near the roadway, radar may detect large obstacles that are not actually an interference to the vehicle's travel path. In yet another example, a radar on the side of a vehicle may have difficulty distinguishing between other vehicles on the roadway in a heavy traffic situation and objects expected to be detected along the side of the roadway (e.g., roadside barriers, signs, and/or the like). In another example, thermal sensors may not useful in situations where the ambient temperature is quite cold or quite hot. In another example, GNSS information/data may not be reliable in locations such as urban canyons or remote locations. In still another example, cameras and/or other visual imaging sensors may not be capable of capturing useful images at night, in dense fog, with blinding sun, during heavy rain, in lightning storms, and/or other low visibility situations. Thus, the effectiveness of a particular sensor type and/or the usability of sensor information/data captured by a particular sensor type may be driving condition dependent. In various embodiments, the term driving conditions may include location, date and/or time, weather conditions (e.g., precipitation type, precipitation rate, cloud cover, temperature, humidity, cloud ceiling, and/or the like), traffic condition, road position (e.g., far right lane, far left lane, middle lane, and/or the like), and/or other condition affecting the environment around the vehicle 5.

In various embodiments, the term sensor type may refer to a category of sensors (e.g., visual camera, lidar, radar, GNSS sensor, thermal camera, ultrasonic sensor, and/or the like). In an example embodiment, the term sensor type may refer to a particular brand and/or model of sensor (e.g., Sensor Model XYZ123). In an example embodiment, the term sensor type may refer to a position and/or orientation of the sensor on the vehicle (above the windshield and forward facing, on the grill of the vehicle and forward facing, side facing, rear facing, and/or the like). In various embodiments a sensor type may be hierarchical. For example, a sensor type may be IM-XYZ123-AWFF, indicating that the sensor is an imaging sensor of model XYZ123 that is forward facing and positioned above the windshield. For example, such hierarchical sensor types may allow for varying degrees of granularity of determinations regarding the effectiveness and/or usability of category of sensors, particular brands and/or models of sensors of the category of sensors, and the positioning of such sensors on vehicles.

In various embodiments, probe apparatuses onboard vehicles traveling through at least a portion of a road network may capture sensor information/data via one or more sensors onboard the corresponding vehicles. The probe apparatuses may determine sensor quality metrics based on the captured sensor information/data, wherein a sensor quality metric indicates a sensor type corresponding to a sensor used to capture the sensor information/data corresponding to the sensor quality metric, an effectiveness of a corresponding sensor and/or a quality and/or usability of the sensor information/data captured by the corresponding sensor, and/or the like. The probe apparatuses may then provide sensor quality communications comprising sensor quality metrics along with corresponding locations and timestamps indicating the location and date and/or time where the corresponding sensor information/data was captured. In various embodiments, a location is indicated by geospatial coordinates (e.g., latitude and longitude), an offset along road segment or travel lane corresponding to an identified TME of a digital map, and/or the like. In an example embodiment, the timestamp comprises a date and/or time.

A network apparatus may receive a plurality of sensor quality communications (e.g., generated and provided by one or more probe apparatuses) and partition the corresponding sensor quality metrics into groups based on the corresponding locations and timestamps. For example, a location of a sensor quality communication may be map-matched to a TME. In various embodiments, a TME is a link corresponding to a road segment or a lane corresponding to a travel lane of a road segment. In various embodiments, a link or a lane is defined by a start point and an end point. In an example embodiment, a TME may be a sub-link or sub-lane that is a portion of a link or lane, respectively, that is defined by (a) either the start point of the corresponding link or lane or a start off-set point along the corresponding link or lane and (b) either an end off-set point along the corresponding link or lane or the end point of the corresponding link or lane. In another example, the timestamp may be matched to an epoch, wherein an epoch is a predefined period or window of time that may be defined by a date of the year, day of the week, and/or time of day. Each group of sensor quality metrics is associated with a TME and an epoch.

For each group, the network apparatus may request and receive and/or otherwise access (e.g., via one or more informant apparatuses) various driving condition information/data corresponding to the group. In various embodiments, driving condition information/data corresponding to the group comprises weather information/data, traffic information/data, road position information/data, and/or the like corresponding to the TME and epoch corresponding to the group. In various embodiments, the weather information/data comprises information/data regarding weather conditions along the TME during the epoch corresponding to the group. In various embodiments, the traffic information/data comprises information/data regarding traffic conditions along the TME during the epoch corresponding to the group. In various embodiments, the driving condition information/data indicates a degree of various dynamic factors (e.g., weather conditions, traffic conditions, road position, and/or the like). For example, the weather information/data may indicate type of precipitation and a rate (or range of rate) of precipitation. In another example, the traffic information/data may indicate a level or range of traffic (e.g., volume, representative speed, free flow ratio, incident indicator/ information). In various embodiments, a free flow ratio is a ratio of a representative speed of vehicle traversing at least a portion of the TME to a free flow speed of the at least a portion of the TME. In various embodiments, the road position information/data may indicate the position of a travel lane across a road segment. For example, the road position information/data may indicate that a TME is a far right lane, a far left lane, a middle lane, number of lanes to the right and/or left of the road position, and/or the like.

For example group, the network apparatus may determine a sensor quality index for one or more sensor types for the corresponding TME and epoch. In various embodiments, the sensor quality index for a sensor type is determined based on the sensor quality metrics of the group that correspond to sensor information/data captured by sensors of the sensor type. In an example embodiment, the sensor quality index for a sensor type is determined based on a distribution of the sensor quality metrics of the group that correspond to sensor information/data captured by sensors of the sensor type. The sensor quality index may further comprise and/or be associated with at least a portion of corresponding driving condition information/data. A plurality of sensor quality indices corresponding to a TME (e.g., corresponding to a plurality of epochs and/or sensor types) may be aggregated to generate a sensor quality index table corresponding to the TME. In various embodiments, the network apparatus may provide one or more sensor quality index tables such that one or more vehicle apparatuses may receive the sensor quality index tables and use at least a portion thereof for performing one or more navigation functions. In various embodiments, the sensor quality index table may be packaged as part of a digital map. For example, the sensor quality index table may be packaged as part of a digital map tile comprising a data record corresponding to the TME. For example, the digital map tile may provide a representation of the road network in a geographical area comprising the road segment and/or travel lane of the road segment corresponding to the TME. In various embodiments, a plurality of digital map tiles of a digital map provide a regular or irregular tiling of a geographic region represented by the digital map. In an example embodiment, one or more sensor quality index tables are provided as one or more layers of a digital map and/or one or more digital map tiles. In various embodiments, the network apparatus may provide the digital map and/or one or more digital map tiles such that one or more vehicle apparatuses receive the digital map and/or one or more digital map tiles comprising the sensor quality index tables and use at least a portion of the sensor quality index tables for performing one or more navigation functions.

In various embodiments, the sensor quality indices may be analyzed and/or aggregated to determine a driving condition table. In various embodiments, the sensor quality indices corresponding to a sensor type and corresponding to a plurality of TMEs and/or epochs may be analyzed to determine how various driving conditions affect the effectiveness of sensors of the sensor type and/or usability of sensor information/data captured by sensors of the sensor type. The determined effectiveness of sensors of the sensor type and/or usability of sensor information/data captured by sensors of the sensor type during various driving conditions may be summarized in a driving condition table. In various embodiments, a driving condition table may indicate the effectiveness of sensors of the sensor type and/or usability of sensor information/data captured by sensors of the sensor type for a various degrees of one or more dynamic factors (e.g., weather conditions, traffic conditions, road position, and/or the like). For example, a driving condition table may indicate the effectiveness of sensors of the sensor type and/or usability of sensor information/data captured by sensors of the sensor type for a variety of precipitation types and rates (and/or range of rates). For example, an example driving condition table indicates the effectiveness of sensors of the sensor type and/or usability of sensor information/data captured by sensors of the sensor type for light snow, moderate snow, heavy snow, light rain, moderate rain, and heavy rain conditions. In another example, an example driving condition table indicates the effectiveness of sensors of the sensor type and/or usability of sensor information/data captured by sensors of the sensor type for light traffic with a high free flow ratio (and/or representative speed), light traffic with a moderate free flow ratio (and/or representative speed), moderate traffic with a high free flow ratio (and/or representative speed), moderate traffic with a moderate free flow ratio (and/or representative speed), moderate traffic with a low free flow ratio (and/or representative speed), heavy traffic with a high free flow ratio (and/or representative speed), heavy traffic with a moderate free flow ratio (and/or representative speed), and heavy traffic with a low free flow ratio (and/or representative speed) conditions. Various other driving conditions tables may be generated in various embodiments. In various embodiments, the network apparatus may provide one or more driving condition tables such that one or more vehicle apparatuses may receive the driving condition tables and use at least a portion thereof for performing one or more navigation functions. In various embodiments, the driving condition table may be packaged as part of a digital map. For example, the driving condition table may be packaged as part of one or more digital map tiles. In an example embodiment, one or more driving condition tables are provided as one or more layers of a digital map and/or one or more digital map tiles. In various embodiments, the network apparatus may provide the digital map and/or one or more digital map tiles such that one or more vehicle apparatuses receive the digital map and/or one or more digital map tiles comprising the driving condition tables and use at least a portion of the driving condition tables for performing one or more navigation functions.

In various embodiments, a vehicle apparatus is onboard a vehicle and in communication with one or more sensors onboard the vehicle. In various embodiments, a vehicle apparatus may receive one or more sensor quality index tables, driving condition tables, a digital map and/or digital map tile(s) comprising sensor quality index tables and/or driving condition tables. The vehicle apparatus may then use at least a portion of at least one the sensor quality index tables and/or driving condition tables to perform one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like. For example, the vehicle apparatus may determine and/or receive a planned route for the vehicle to navigate. In an example embodiment, the planned route comprises an origin location, a destination location, a traversable route from the origin location to the destination location, a start time, an expected arrival time, and/or the like. The vehicle apparatus may determine current and/or expected driving conditions (e.g., may request and receive and/or otherwise access, possibly via an information apparatus) along at least a portion of the planned route. The vehicle apparatus may use the current and/or expected driving conditions along at least a portion of the planned route and one or more sensor quality index tables and/or driving condition tables to determine the expected effectiveness of one or more sensors onboard the vehicle and/or usability of sensor information/data captured by one or more sensors onboard the vehicle along at least a portion of the planned route (e.g., along one or more TMEs of the traversable route from the origin location to the destination location).

The determined expected effectiveness of one or more sensors onboard the vehicle and/or usability of sensor information/data captured by one or more sensors onboard the vehicle along the at least a portion of the planned route may be evaluated based on a quality threshold requirement (e.g., compared to quality threshold). When it is determined that the expected effectiveness of one or more sensors onboard the vehicle and/or usability of sensor information/data captured by one or more sensors onboard the vehicle is acceptable along the at least a portion of the planned route and/or the quality threshold requirement is satisfied (e.g., the expected effectiveness and/or usability is greater than or equal to the quality threshold), the vehicle apparatus may proceed to driving the vehicle along the planned route in an automated driving fashion, assisting in the driving of the vehicle along the planned route, and/or guiding a human operator to drive the vehicle along the planned route. When it is determined that the expected effectiveness of one or more sensors onboard the vehicle and/or usability of sensor information/data captured by one or more sensors onboard the vehicle is not acceptable along the at least a portion of the planned route and/or the quality threshold requirement is not satisfied (e.g., the expected effectiveness and/or usability is less than the quality threshold), the vehicle apparatus may perform one or more low sensor quality mitigation functions.

In various embodiments, a low sensor quality mitigation function may comprise determining a new route from the origin location to the destination location wherein the entirety of the new route (and/or a larger portion of the new route compared to the planned route) has expected sensor effectiveness and/or usability that is acceptable (e.g., satisfies the threshold requirement); determining a modified sensor usage plan (e.g., adjusting one or more weights assigned to sensor information/data captured by one or more sensors onboard the vehicle in one or more algorithms that use sensor information/data to perform navigation functions) for one or more portions of the route (e.g., the planned route or a new route); identify a human operator assistance portion of a route (e.g., the planned route or a new route); activating one or more secondary sensors along one or more portions of the route (e.g., the planned route or a new route); and/or the like. In various embodiments, a human operator of the vehicle may be provided with a notification that the vehicle is approaching the human operator assistance portion of the route prior to the vehicle reaching the human operator assistance portion. For example, the notification may be provided to the human operator a set distance or time before the vehicle is expected to reach the human operator assistance portion (e.g., one minute, five minutes, ten minutes, fifteen minutes, quarter of a mile, half a mile, one mile, five miles, half a kilometer, a kilometer, five kilometers, ten kilometers, fifteen kilometers, and/or the like before the vehicle reaches the human operator assistance portion). The vehicle apparatus may then transfer control of the vehicle to the human operator through the human operator assistance portion of the route and, in an example embodiment, offer to and/or to automatically resume control and/or assisting to control the vehicle once the vehicle exits and/or completes the human operator assistance portion of the route. Various other low sensor quality mitigation functions and/or combinations of determining a new route, determining a modified sensor usage plan, a human operator assistance portion, activating one or more secondary sensors, and/or other low sensor quality mitigation functions may be used, in various embodiments.

FIG. 1 provides an illustration of an example system that can be used in conjunction with various embodiments of the present invention. As shown in FIG. 1, the system may include one or more network apparatuses 10, one or more probe apparatuses 20, wherein each probe apparatus 20 is disposed on a vehicle 5, one or more vehicle apparatuses 30, wherein each vehicle apparatus 30 is disposed on a vehicle 5, one or more informant apparatuses 40, one or more networks 50, and/or the like. In various embodiments, the probe apparatus 20 and/or vehicle apparatus 30 may be an in vehicle navigation system, vehicle control system, a mobile computing device, a mobile data gathering platform, and/or the like. For example, a probe apparatus 20 and/or vehicle apparatus 30 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the probe apparatus 20 and/or vehicle apparatus 30 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the probe apparatus 20 and/or vehicle apparatus 30 is configured to autonomously drive a vehicle 5 may perform multiple functions that are similar to those performed by a probe apparatus 20 and/or vehicle apparatus 30 configured to be an ADAS (e.g., lane keeping, lane change assistance, maintaining a lane, merging, etc.). In some embodiments, a probe apparatus 20 and/or vehicle apparatus 30 may be onboard a personal vehicle, commercial vehicle, public transportation vehicle, fleet vehicle, and/or other vehicle. In various embodiments, the probe apparatus 20 and/or vehicle apparatus 30 may be a smartphone, tablet, personal digital assistant (PDA), personal computer, desktop computer, laptop, and/or other mobile computing device. In an example embodiment, the probe apparatus 20 are onboard fleet vehicles and comprise a mobile data gathering platform. In an example embodiment, a vehicle apparatus 30 is onboard a vehicle 5 and is used to perform one or more navigation functions corresponding to the vehicle 5 traversing at least a portion of a road network. In an example embodiment, the network apparatus 10 and/or informant apparatus 40 may each be a server, group of servers, distributed computing system, and/or other computing system. In an example embodiment, the network apparatus 10 and/or informant apparatus 40 are not located onboard a vehicle. For example, the network apparatus 10 may be in communication with one or more probe apparatuses 20, one or more vehicle apparatuses 30, one or more informant apparatuses 40, and/or the like via one or more wired or wireless networks 50.

In an example embodiment, a network apparatus 10 may comprise components similar to those shown in the example network apparatus 10 diagrammed in FIG. 2A. In an example embodiment, the network apparatus 10 is configured to receive sensor quality communications from one or more probe apparatuses 20, generate and provide one or more sensor quality index tables and/or driving condition tables, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory. In an example embodiment, the processor 12 may comprise one or more central processing units (CPUs) and one or more graphics processing units (GPUs).

In an example embodiment, a probe apparatus 20 is onboard a vehicle 5. In an example embodiment, the probe apparatus 20 may be configured to capture sensor information/data via one or more sensors onboard the vehicle 5, determine one or more sensor quality metrics based the sensor information/data, and provide the sensor quality metric (e.g., as part of a sensor quality communication) such that a network apparatus 10 receives the sensor quality metric. In an example embodiment, the probe apparatus 20 is configured to determine a location (e.g., geolocation such as latitude and longitude and/or the like) of the vehicle 5 and/or probe apparatus 20 when the corresponding sensor information/data was captured. In an example, a location indicates a position and/or heading of the vehicle 5 at the time the sensor information/data was captured. In an example embodiment, the probe apparatus 20 is configured to determine a timestamp indicating the date and/or time that the instance of sensor information/data was captured.

In an example embodiment, as shown in FIG. 2B, the probe apparatus 20 may comprise a processor 22, memory 24, a communications interface 26, a user interface 28, one or more sensors 29 (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, a vehicle apparatus 30 is onboard a vehicle 5. In an example embodiment, the vehicle apparatus 30 may be configured to receive one or more sensor quality index tables and/or driving condition tables (e.g., possibly as part of a digital map and/or one or more digital map tiles) and use at least a portion of the one or more sensor quality index tables and/or driving condition tables to perform one or more navigation functions. In an example embodiment, as shown in FIG. 2C, the vehicle apparatus 30 may comprise a processor 32, memory 34, a communications interface 36, a user interface 38, one or more sensors 39 (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 30 to determine one or more features of the corresponding vehicle's 5 surroundings and/or monitor the vehicle's 5 operating parameters), and/or other components configured to perform various operations, procedures, functions or the like described herein. In at least some example embodiments, the memory 34 is non-transitory.

In an example embodiment, an informant apparatus 40 may be configured to provide driving condition information/data. For example, the informant apparatus 40 may be configured to provide weather information/data, traffic information/data, road position information/data, and/or the like for one or more TMEs and/or one or more times (e.g., epochs). In various embodiments, an informant apparatus 40 comprises components similar to those shown in the example network apparatus 10 diagrammed in FIG. 2A. For example, the informant apparatus 40 may comprise a processor, memory, a user interface, a communications interface, and/or other components configured to perform various operations, procedures, functions or the like described herein. In at least some example embodiments, the memory is non-transitory. In an example embodiment, the processor may comprise one or more central processing units (CPUs) and one or more graphics processing units (GPUs).

In an example embodiment, the network apparatus 10 may be in communication with one or more of probe apparatuses 20, one or more vehicle apparatuses 30, and/or one or more informant apparatuses 40. In an example embodiment, the network apparatus 10 may generate and/or provide one or more sensor quality index tables and/or driving condition tables. In various embodiments, a sensor quality index table comprises one or more sensor quality indices and, for each sensor quality index, a sensor identifier (ID) indicating a sensor type, a TME ID, an epoch ID, driving condition information/data, and/or the like. In various embodiments, a driving condition table comprises one or more sensor quality indices and, for each sensor quality index, a sensor ID and driving condition information/data. Though described as tables herein, one or more sensor quality index tables and/or driving condition tables may be provided in various forms such as tables, flat files, hierarchical formats such as data trees or mark-up language files, queryable databases, and/or the like.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20, vehicle apparatus 30, and/or informant apparatus 40 may be in communication with a network apparatus 10 via the network 50. For example, a probe apparatus 20, vehicle apparatus 30, and/or informant apparatus 40 may communicate with the network apparatus 10 via a network, such as the Cloud. For example, the Cloud may be a computer network that provides shared computer processing resources and data to computers and other devices connected thereto. For example, the probe apparatus 20 may be configured to provide one or more sensor quality communications via the network 50. For example, the network apparatus 10 may configured to receive a plurality of sensor quality communications, request and/or receive driving condition information/data, and provide sensor quality index tables, driving condition tables, and/or digital maps and/or digital maps tiles comprising sensor quality index tables and/or driving condition tables via the network 50. For example, a vehicle apparatus 30 may be configured to receive one or more sensor quality index tables, driving condition tables, and/or digital maps and/or digital maps tiles comprising sensor quality index tables and/or driving condition tables via the network 50. For example, an informant apparatus 40 may be configured to provide driving condition information/data via the network 50.

Certain example embodiments of the network apparatus 10, probe apparatus 20, vehicle apparatus 30, and/or informant probe apparatus 40 are described in more detail below with respect to FIGS. 2A, 2B, and 2C.

II. Example Operation

Example embodiments provide methods, apparatus, systems, computer program products, and/or the like for generating and/or updating sensor quality index tables and/or driving condition tables and using the sensor quality index tables and/or driving condition tables to perform one or more navigation functions. For example, the sensor quality index tables and/or driving condition tables may be used to identify and mitigate situations where one or more sensors onboard a vehicle are expected to have a low sensor quality (e.g., a sensor effectiveness and/or usability that is below an acceptable level). For example, various embodiments provide for identifying and mitigating situations wherein various sensors may be technically working properly, but due to driving conditions under which the various sensors are capturing sensor information/data, the various sensors are not functioning effectively. Various features of some example embodiments will now be described in more detail.

a. Exemplary Operation of a Probe Apparatus

In various embodiments, a probe apparatus 20 is onboard a vehicle 5 that is traversing at least a portion of a road network. In various embodiments, one or more sensors 29 are onboard the vehicle 5 and are in communication with the probe apparatus 20. In an example embodiment, the road network is represented by a digital map (e.g., possibly in the form of a geographic database). In various embodiments, the probe apparatus 20 captures sensor information/data via the one or more sensors 29 as the vehicle 5 traverses the at least a portion of the road network. The probe apparatus 20 may be configured to generate one or more sensor quality metrics and provide the one or more sensor quality metrics in one or more sensor quality communications. In various embodiments, the sensor quality communications are provided by the probe apparatus 20 such that a network apparatus 10 receives the sensor quality communications for use in generating and/or updating one or more sensor quality index tables and/or driving condition tables.

FIG. 3 provides a flowchart illustrating operations performed, such as by the probe apparatus 20 of FIG. 2B to provide a sensor quality communication. Starting at block 302, sensor information/data is captured. For example, as the vehicle 5 traverses at least a portion of the road network, one or more sensors 29 may capture sensor information/data and communicate the sensor information/data to the probe apparatus 20. For example, the probe apparatus 20 may capture sensor information/data. For example, the probe apparatus 20 may comprise means, such as the processor 22, memory 24, sensors 29, and/or the like, for capturing sensor information/data. In various embodiments, the sensor information/data describes at least a portion of the environment surrounding the vehicle 5. For example, the sensor information/data may comprise GNSS information/data, digital images, lidar point clouds, radar point clouds, ultrasonic information/data, electromagnetic information/data, thermal information/data, and/or the like. In various embodiments, the probe apparatus 20 may concurrently determine a location of the vehicle 5 and/or the probe apparatus 20 and a timestamp corresponding to the date and/or time at which the location of the vehicle 5 and/or the probe apparatus 20 is determined and sensor information/data is captured. For example, the vehicle apparatus 20 may determine a location of the vehicle 5 and/or the probe apparatus 20 based on GNSS information/data, IMU sensor information/data, visual odometry (e.g., based on one or more digital images), and/or other localization techniques and/or a combination thereof. In various embodiments, the probe apparatus 20 comprises and/or is communication with an apparatus comprising clock such that the probe apparatus 20 may determine a timestamp corresponding to the date and/or time at which the location of the vehicle 5 and/or the probe apparatus 20 is determined and the sensor information/data is captured.

In various embodiments, the sensor information/data comprises driving condition information/data describing weather conditions, traffic conditions, road position, and/or the like corresponding to the environment about the vehicle 5. For example, in an example embodiment, the sensor information/data may comprise weather information/data, traffic information/data, road position information/data, and/or the like. In various embodiments, the probe apparatus 20 may provide the driving condition information/data and/or a portion thereof to the network apparatus 10. In an example embodiment, at least a portion of the weather information/data, traffic information/data, and/or the like is captured by one or more sensors corresponding to and/or in communication with an informant apparatus 40 (e.g., a weather station computing entity, traffic management computing entity, and/or the like). At least a portion of the weather information/data, traffic information/data and/or the like is provided to the network apparatus 10 by the informant apparatus 40.

At block 304, a sensor quality metric is determined. For example, the probe apparatus 20 may determine a sensor quality metric for sensor information/data captured by one or more sensors 29. For example, the probe apparatus 20 may comprise means, such as processor 22, memory 24, and/or the like, for determining a sensor quality metric for sensor information/data captured by one or more sensors 29. In various embodiments, a sensor quality metric determined based on sensor information/data captured by a first sensor of the one or more sensors 29 may indicate whether the sensor information/data captured by the first sensor is usable or not for completing one or more functions of the probe apparatus 20, the degree of effectiveness of the first sensor and/or usability of the sensor information/data captured by the first sensor, and/or the like. In various embodiments, a sensor quality metric is associated with a sensor type corresponding to the type of sensor that captured the sensor information/data used to determine the sensor quality metric.

For example, if the first sensor is a camera and/or other visible imaging device, the sensory quality metric may indicate whether one or more aspects of the quality of a captured image are acceptable for use of the captured image. For example, if the ambient light levels are low (e.g., during dusk, night, pre-dawn, dense cloud cover, and/or the like), an image will be underexposed and may not be particularly useful to the probe apparatus 20 for completing one or more functions of the probe apparatus 20. In another example, if a camera is pointed toward the sun (e.g., during sunrise or sunset), a captured image may be overexposed and may not be particularly useful to the probe apparatus 20 for completing one or more functions of the probe apparatus 20. In an example embodiment, the probe apparatus 20 may determine a sensor quality metric of 0, poor, and/or the like if it is determined that a captured image is under or over exposed and may determine a sensor quality metric of 1, good, and/or the like if it is determined that a captured image has a balanced exposure (e.g., is not under or over exposed).

For example, the probe apparatus 20 may analyze an image to determine a brightness distribution of the pixels of the image. For example, FIGS. 4A, 4B, and 4C provide example histograms 400 (e.g., 400A, 400B, 400C) illustrating the brightness distribution 402 (e.g., 402A, 402B, 402C) of three different images. The horizontal axis is the brightness level of a pixel, going from dark on the left to bright on the right. The vertical axis is the number of pixels exhibiting a particular brightness level. FIG. 4A illustrates an example brightness distribution 402A indicating an underexposed image, FIG. 4B illustrates an example brightness distribution 402B indicating an overexposed image, and FIG. 4C illustrates an example brightness distribution 402C indicating a balanced exposure image. For example, it may be determined (e.g., by the probe apparatus 20) if the peak 404 (e.g., 404A, 404B, 404C) of the brightness distribution 402 of the image satisfies one or more threshold requirements. For example, it may be determined if the peak 404 of the brightness distribution 402 of the image satisfies a low brightness threshold requirement. For example, if the peak 404 of the brightness distribution 402 of the image is less than the low brightness threshold 406, it may be determined that the image is underexposed. For example, it may be determined (e.g., by probe apparatus 20) if the peak 404 (e.g., 404A, 404B, 404C) of the brightness distribution 402 of the image satisfies a high brightness threshold requirement. For example, if the peak 404 of the brightness distribution 402 of the image is greater than the high brightness threshold 408, it may be determined that the image is overexposed. Similarly, if the peak 404 of the brightness distribution 402 of the image is between the low brightness threshold 406 and the high brightness threshold 408, it may be determined that the image is a balanced exposure. In another example, the width of the peak 404 of the brightness distribution 402 of the image may be used to determine if the brightness distribution 402 of the image satisfies a threshold requirement. For example, if the width (e.g., the full-width at half-maximum (FWHM) and/or other measure of width) of the peak 404 of the brightness distribution 402 and/or the standard deviation of the brightness distribution 402 of the image is greater than a width threshold or standard deviation threshold, respectively, it may be determined that the image is a balanced exposure and if the width of the peak 404 of the brightness distribution 402 and/or standard deviation of the brightness distribution 402 of the image is less than a width threshold or standard deviation threshold, respectively, it may be determined that the image is underexposed or overexposed. Once, the exposure of the image has been determined, the sensor quality metric for the sensor 29 that captured the image may be determined, assigned, and/or the like based on the determined exposure of the image captured by the sensor 29. The sensor quality metric is associated with a sensor type corresponding to the sensor 29 that captured the image.

In another example, if the first sensor is a GNSS sensor, the sensor quality metric may indicate a difference between the location indicated by the captured GNSS information/data compared to ground truth location of the vehicle 5 (e.g., determined via IMU sensor information/data, visual odometry, and/or the like), whether the difference between the location indicated by the captured GNSS information/data and the ground truth location of the vehicle 5 satisfies a threshold requirement (e.g., if the difference is too large for the GNSS information/data to be usable such as greater than two meters, five meters, ten meters, and/or the like), and/or the like. For example, if the difference between the location indicated by the captured GNSS information/data and the ground truth location of the vehicle 5 is greater than a distance threshold, it may be determined that the effectiveness of the GNSS sensor and/or the usability of sensor information/data captured by the GNSS sensor is poor and the corresponding sensor quality metric may be assigned accordingly. In another example embodiment, an electromagnetic sensor may determine a heading of the vehicle 5 and the determined heading may be compared to a ground truth heading of the vehicle (e.g., based on a comparison of a captured image to localization features provided in a localization of a digital map as described in U.S. Pub. No. 2018/0293466 (application Ser. No. 15/479,635, filed Apr. 5, 2017), the content of which is incorporated herein by reference in its entirety). If the difference between the determined heading the ground truth heading is more than a threshold difference (e.g., more than half a degree, one degree, two degrees, five degrees, ten degrees, and/or the like), it may be determined that the effectiveness of the electromagnetic sensor and/or the usability of sensor information/data captured by the electromagnetic sensor is poor and the corresponding sensor quality metric may be assigned accordingly. In yet another example, a radar may generate a point cloud indicating the proximity of an object to the vehicle 5. A measure of consistency may be used to determine how consistent and/or erratic the sensor information/data captured by the radar is. If the sensor information/data captured by the radar is highly consistent, the effectiveness of the radar and/or usability of the sensor information/data captured by the radar is high and if the sensor information/data is inconsistent and/or erratic, the effectiveness of the radar and/or the usability of the sensor information/data captured by the radar is poor. The sensor quality metric corresponding to the radar may then be determined and/or assigned accordingly. In still another example, a vehicle 5 may have a lidar onboard configured to capture sensor information/data such as a point cloud. Based on the location of the vehicle 5, one or more objects expected to be represented in the point cloud may be determined and/or identified. The point cloud may then be analyzed to determine if the determined and/or identified objects are represented by the point cloud or not. If the determined and/or identified objects are represented by the point cloud in an identifiable manner, the effectiveness of the lidar and/or usability of the sensor information/data captured by the lidar is high and if the determined and/or identified objects are not represented by the point cloud in an identifiable manner, the effectiveness of the lidar and/or usability of the sensor information/data captured by the lidar is poor. The corresponding sensor quality metric may then be determined and/or assigned accordingly.

At block 306, a sensor quality communication is provided. For example, the probe apparatus 20 may provide a sensor quality communication such that a network apparatus 10 receives the sensor quality communication. For example, the probe apparatus 20 may comprise means, such as processor 22, memory 24, communications interface 26, and/or the like, for providing a sensor quality communication such that the network apparatus 10 receives the sensor quality communication. In various embodiments, a sensor quality communication is a communication comprising one or more sensor quality metrics, a sensor ID identifying a sensor type corresponding to each sensor quality metric, a location and timestamp indicating the location and date and/or time at which the sensor information/data used to determine the sensor quality metric was captured, and/or the like. For example, the probe apparatus may regularly and/or periodically (e.g., based on a time and/or travel distance trigger) provide one or more sensor quality communications.

b. Exemplary Operation of a Network Apparatus

In various embodiments, a network apparatus 10 may be configured to receive a plurality of sensor quality communications. The network apparatus 10 may then partition the sensor quality communications into groups based on the location of each sensor quality communication and/or a map-matched location (e.g., a TME) corresponding to location of each sensor quality communication, the timestamp of each sensor quality communication, the sensor ID of each sensor quality communication, and/or the like. A distribution of sensor quality metrics for a group of sensor quality communications may be determined and analyzed and a sensor quality index for the group may be determined. Driving condition information/data (e.g., weather information/data, traffic information/data, road position information/data, and/or the like) may be accessed and/or received (e.g., from an informant apparatus 40) and associated with the groups of sensor quality communications. One or more sensor quality index tables may then be generated and/or updated based on the sensor quality index corresponding to a group, a TME, timestamp, and/or sensor ID corresponding to the group, and the driving condition information/data corresponding to the group. In various embodiments, the sensor quality metrics and/or sensor quality index tables may be analyzed to determine one or more driving condition tables that provide a sensor quality index indicating an expected effectiveness of a sensor and/or usability of sensor information/data captured by a sensor of the sensor type identified by the sensor ID under various driving conditions. The sensor quality index tables and/or driving condition tables may be provided to one or more vehicle apparatuses. In an example embodiment, the sensor quality index tables and/or driving condition tables may be provided as part of a digital map and/or one or more digital map tiles.

FIG. 5 provides a flowchart illustrating operations performed, such as by the network apparatus 10 to generate and provide one or more sensor quality index tables and/or driving condition tables, in accordance with an example embodiment. Starting at block 502, a plurality of sensor quality communications are received. For example, the network apparatus 10 may receive a plurality of sensor quality communications provided by one or more probe apparatuses 20. For example, a network apparatus 10 may comprise means, such as processor 12, memory 14, communications interface 16, and/or the like, for receiving a plurality of sensor quality communications.

At block 504, the plurality of sensor quality communications are partitioned into groups. In various embodiments, each group corresponds to a TME, an epoch, a sensor type, and/or the like. For example, in various embodiments, each sensor quality communication comprises a location, a timestamp, and a sensor ID identifying a sensor type and/or identifying a particular sensor and/or sensor configuration. The location may be map-matched to a TME and/or the timestamp may be matched to an epoch. In various embodiments, an epoch is a predefined period or window of time that may be defined by a date of the year, day of the week, and/or time of day. In an example embodiment, a year may be divided into a plurality of epochs each having a predefined time length. In an example embodiment, a week may be divided into a plurality of epochs each having a predefined time length. In an example embodiment, a day may be provided into a plurality of epochs each having a predefined time length. In an example embodiment, the predefined time length is fifteen minutes. For example, a year may be divided into approximately 35,063 epochs each having a predefined time length of fifteen minutes. For example, a week may be divided into approximately 672 epochs each having a predefined time length of fifteen minutes. In yet another example, a day may be divided into 96 epochs each having a predefined time length of fifteen minutes. In embodiments wherein the sensor ID identifies a particular sensor and/or sensor configuration, the particular sensor and/or sensor configuration may be matched to a sensor type. Each sensor quality communication may then be partitioned into a group based on the TME to which the location of the sensor quality communication was map-matched, the epoch to which the timestamp was matched, and the sensor ID identifying a corresponding sensor type. For example, the network apparatus 10 may partition the plurality of sensor quality communications into groups. For example, the network apparatus 10 may comprise means, such as processor 12, memory 14, and/or the like, for partitioning the plurality of sensor quality communications into groups.

At block 506, driving conditions for each group are determined. For example, the network apparatus 10 may determine driving conditions for each group. For example, the network apparatus 10 may comprise means, such as processor 12, memory 14, communications interface 16, and/or the like for determining driving conditions for each group. For example, the network apparatus 10 may request and receive driving condition information/data from one or more informant apparatuses 40. In an example embodiment, one or more informant apparatuses may periodically provide driving condition information/data (e.g., once per epoch, and/or the like). In various embodiments, the network apparatus 10 receives driving condition information/data (e.g., provided by one or more informant apparatuses 40) associated with one or more timestamps and one or more locations. In various embodiments, the driving condition information/data comprises weather information/data, traffic information/data, road position information/data, and/or the like. For example, the weather information/data may include a precipitation type, precipitation rate, cloud cover, sun rise and/or sun set time, part of day indicator (e.g., night time, day time, dawn, dusk), cloud ceiling, visibility, temperature, humidity, obstructions to visibility, and/or the like. For example, the traffic information/data may indicate a degree of traffic, traffic conditions, and/or the like such as volume, representative speed, free flow ratio, incident indicator/information, and/or the like. In various embodiments, the volume may indicate a number of vehicles per minute, a number of vehicle per epoch, and/or the like traveling along the TME. In various embodiments, the representative speed may be a range of speeds; a mean, median, or mode; or other description of a distribution of speeds provided by probe apparatuses 20 traveling along the TME. In various embodiments, the free flow ratio may be a ratio (and/or an indication of the ratio) of a representative speed for the TME during the epoch and a free flow speed of the TME. In another example, road position information/data may indicate the position of a TME that is a lane of a road network with respect to adjacent lanes of the road network (e.g., far right lane, second right lane, middle lane, second left lane, far left lane, reversible lane, high occupancy vehicle (HOV) lane, express lane, toll lane, variable toll lane, and/or the like.

In an example embodiment, the traffic information/data and/or road position information/data may be TME level and/or link level traffic information/data and/or road position information/data. For example, traffic information/data and/or road position information/data may correspond to a link (e.g., representing a road segment) and/or a lane (e.g., representing a travel lane) of a road network. In an example embodiment, weather information/data may be received that is particular to a TME or a lane of a road network. In another example embodiment, weather information/data may be received that corresponds to measurements captured at and/or predictions corresponding to one or more weather stations and one or more weather interpolation algorithms may be used to determine weather information/data for a particular TME. For example, one or more weather algorithms may be used to determine TME and/or lane level weather information/data from received sparse weather information/data. For example, one or more weather algorithms may be used to interpolate TME and/or lane level weather information/data from sparse weather information/data, for example, as described in U.S. Pub. No. 2017/0276834 (U.S. application Ser. No. 15/077,507, filed Mar. 22, 2016) the content of which is incorporated herein by reference in its entirety. For example, weather information/data, traffic information/data, road position information/data, and/or other driving condition information/data describing the weather conditions, traffic conditions, road position, and/or other driving conditions under which the sensor information/data used to determine the sensor quality metrics partitioned into a first group are determined and associated with the first group.

At optional block 508, a distribution of sensor quality metrics for each group is determined. For example, the network apparatus 10 may determine a distribution of sensor quality metrics for each group. For example, the network apparatus 10 may comprise means, such as processor 12, memory 14, and/or the like, for determining a distribution of sensor quality metrics for each group. For example, a plurality of sensor quality communications each comprising a sensor quality metric may be partitioned into a first group. A distribution of the sensor quality metrics corresponding to plurality of sensor quality communications may be determined.

At optional block 510, it may be determined whether the distribution of sensor quality metrics for each group is unimodal. For example, the network apparatus 10 may determine if the distribution of sensor quality metrics for each group is unimodal. For example, the network apparatus 10 may comprise means, such as processor 12, memory 14, and/or the like for determining if the distribution of sensor quality metrics for each group is unimodal. For example, if the sensor quality metric is a binary metric (e.g., has a value of either zero or one), it may be determined if a minimum percentage of the sensor quality metrics are in agreement. For example, if more than the minimum percentage of the sensor quality metrics have a particular value, it may be determined that distribution of sensor quality metrics is unimodal. Similarly, if 50% to the minimum percentage of the sensor quality metrics have a particular value, it may be determined that the distribution of sensor quality metrics is not unimodal. In an example embodiment, the minimum percentage may be 60%, 65%, 70%, 75%, 80%, and/or the like. In an example embodiment, the minimum percentage may be determined based on the number of sensor quality metrics of the group. For example, the minimum percentage may be determined based on what percentage would indicate a statistically significant difference given the number of sensor quality metrics of the group. In another example embodiment, the sensor quality metrics may have a value within a particular range and it may be determined if the distribution of sensor quality metrics is an aggregate distribution of two or more statically significantly different distributions of sensor quality metrics.

For example, FIG. 6 illustrates a scenario where the sensor quality metrics of a group corresponding to TME 600 may be an aggregate distribution that is not unimodal. For example, the group may correspond to vehicles traveling in direction 610 along the TME 600. The TME has a start point 602A and an end point 602B. Sensor quality metrics of the group corresponding to the TME 600 and corresponding to locations between the start point 602A and start off-set point 604A may provide a first distribution. Sensor quality metrics of the group corresponding to the TME 600 and corresponding to a locations between the start off-set point 604A and the end off-set point 604B may provide a second distribution. Sensor quality metrics of the group corresponding to the TME 600 and corresponding to a locations between the end off-set point 604B and the end point 602B may provide a third distribution. The first and third distributions may be similar, in some scenarios. However, due to the curvature of the TME 600, the second distribution may be distinct (e.g., statically significantly different) from the first and third distributions. For example, along first sub-TME 606A and third sub-TME 606C, the corresponding distributions of sensor quality metrics may indicate that sensors of the corresponding sensor type are usable during a corresponding epoch. However, along the second sub-TME 606B, the corresponding distribution of sensor quality metrics may indicate that sensors of the corresponding sensor type are not usable during a corresponding epoch.

If, at block 510, it is determined that one or more groups have distributions of sensor quality metrics that are not unimodal, the process continues to block 512. A block 512, one or more groups having distributions of sensor quality metrics may be partitioned into sub-groups. For example, each sub-group may correspond to a sub-TME (e.g., 606A, 606B, 606C). For example, one or more off-set points 604 may be defined along a TME corresponding to a group having a non-unimodal distribution. The one or more off-set points 604 may be defined so as to separate the statistically significantly different distributions of sensor quality metrics based on the location (e.g., offset along the TME) corresponding to the sensor quality metrics. In an example embodiment, the one or more off-set points 604 may be defined based on an iterative technique. In an example embodiment, the location of the off-set points 604 in the initial iteration of the iterative technique may be determined based on the geometry and/or topology of the corresponding TME (e.g., as described by map information/data corresponding to the TME). For example, the network apparatus 10 may define one or more off-set points 604 along a TME 600 and partition sensor quality metrics of a group corresponding to the TME 600 into sub-groups based on the location associated with each sensor quality metric and the off-set points 604. For example, the network apparatus 10 may comprise means, such as processor 12, memory 14, and/or the like, for partitioning a group into two or more sub-groups. For example, a sub-group may correspond to a sub-TME, an epoch, a sensor type, and/or the like. The process may then continue to block 514, as shown in FIG. 5.

If, at block 510, it is determined that all of the groups have unimodal distributions of sensor quality metrics, the process may continue to block 514. At block 514, a sensor quality index is determined for each group (and each sub-group, if relevant). In various embodiments, the sensor quality index for a group (or sub-group) is determined based on the sensor quality metrics of the group (or sub-group) and/or the distribution of sensor quality metrics of the group (or sub-group). For example, the sensor quality index for a group may be a mean, median, or mode of the sensor quality index for a group (or sub-group) and/or the distribution of sensor quality metrics of the group (or sub-group). For example, in an example scenario where ten sensor quality communications are partitioned into a first group and eight of the corresponding sensor quality metrics have a value of 1 and the other two corresponding sensor quality metrics have a value of 0, the sensor quality index for the group may be determined to be 80% in an example embodiment, and 100% in another example embodiment. For example, the network apparatus 10 may determine a sensor quality index for each group (and sub-group). For example, the network apparatus 10 may comprise means, such as processor 12, memory 14, and/or the like, for determining a sensor quality index for each group (and sub-group). In various embodiments, the sensor quality index indicates the effectiveness and/or usability of sensors of the corresponding sensor type at locations along the corresponding TME during the corresponding epoch.

At block 516, one or more sensor quality index tables may be generated and/or updated based on the sensor quality index determined for one or more groups and the corresponding driving condition information/data. For example, the network apparatus 10 may generate and/or update one or more sensor quality index tables based on the sensor quality index determined for one or more groups and the corresponding driving condition information/data. For example, the network apparatus 10 my comprise means, such as processor 12, memory 14, and/or the like, for generating and/or updating one or more groups and the corresponding driving condition information/data. FIG. 7 illustrates and example sensor quality index table 700. In various embodiments, a sensor quality index table 700 comprises a plurality of rows, with each row corresponding to a group. In an example embodiment, a sensor quality index table 700 comprises a sensor data portion 702 (e.g., a plurality of columns corresponding to sensor data) and a driving condition portion 704 (e.g., a plurality of columns corresponding to driving conditions). In an example embodiment, the sensor data portion 702 comprises a sensor ID column for indicating the sensor type for each row, an epoch ID column for indicating the epoch for each row, a TME ID column for indicating the TME (or sub-TME) for each row, and a sensor quality index column. In various embodiments, the driving condition portion 704 comprises a plurality of columns that correspond to various aspects of driving condition information/data corresponding to a group. For example, the driving condition portion 704 may comprise a plurality of columns of weather information/data (e.g., precipitation type, precipitation rate, cloud cover, visibility, obstructions to visibility, temperature, humidity, cloud ceiling, and/or the like), one or more columns of traffic information/data (e.g., volume, representative speed, free flow ratio, incident indicator/information, and/or the like), one or more columns corresponding to road position, and/or the like. In various embodiments, the driving condition information/data indicates a degree to which various dynamic factors, such as weather, traffic, road position, and/or other factors are in affect along a TME during an epoch. As should be understood, various embodiments may switch the role of the elements (e.g., rows and columns) (with respect to the example sensor quality index table 700) of a sensor quality index table.

As noted above, in an example embodiment, a sensor ID may be hierarchical. For example, a sensor type may be IM-XYZ123-AWFF, indicating that the sensor is an imaging sensor of model XYZ123 that is forward facing and positioned above the windshield. In an example embodiment, a sensor quality index table may comprise a row corresponding to all forward facing imaging sensors and a row corresponding particularly to model XYZ123 of imaging sensor positioned in a forward facing manner on a vehicle 5. For example, if a sufficient number of sensor quality metrics corresponding to a particular brand/model and/or configuration of sensors are available, more particular and/or granular sensor quality indices may be provided via the sensor quality index tables.

In an example embodiment, each sensor quality index table corresponds to a particular TME, a particular epoch, a particular sensor type, and/or the like. For example, a sensor quality index table may comprise a sensor quality indices for a plurality of epochs and a plurality of sensor types all corresponding to a particular TME (or sub-TME). For example, a sensor quality index table that corresponds to a particular TME (or sub-TME) may be stored to and/or referenced by a data record corresponding to the TME in a geographic database of a digital map.

In an example embodiment, one or more driving condition tables may be determined. For example, a network apparatus 10 may analyze one or more sensor quality index tables to determine one or more driving condition tables. For example, the network apparatus 10 may comprise means, such as processor 12, memory 14, and/or the like, for determining one or more driving condition tables. In various embodiments, a driving condition table provides sensor quality indices for one or more sensor types for a variety of driving conditions and/or combinations of driving conditions. For example, FIG. 8 provides an example driving condition table 800 for precipitation type and rate. In various embodiments, a driving condition table 800 is determined based on sensor quality indices for a plurality of TMEs and/or epochs. For example, the sensor quality indices provided by a driving condition table 800 provide an expected effectiveness and/or usability of a sensor of the corresponding sensor type (e.g., as indicated by the sensor ID) under a set of driving conditions, independent of TME or epoch. For example, the driving condition table 800 provides sensor quality indices for a sensor of sensor type identified by sensor ID S1 under various precipitation conditions (e.g., type of precipitation and precipitation rate). In another example, a driving condition table may be generated that provides sensor quality indices for combinations of driving conditions such as type of precipitation, precipitation rate, cloud ceiling, and free flow rate. A variety of combinations of driving conditions may be used to generate one or more driving condition tables.

In various embodiments, a driving condition table may be generated by analyzing one or more sensor quality index tables. For example, one or more sensor quality index tables may be used to identify one or more sensor quality indices for one or more combinations of sets of driving conditions. For example, the set of driving conditions may be precipitation rate and precipitation type and the combinations may comprise snow at a rate of less than a light snow threshold (e.g., 12.7 mm/hour), snow at a rate between the light snow threshold and a heavy snow threshold (e.g., 12.7-25.4 mm/hour), snow at a rate of greater than a heavy snow threshold (e.g., 25.4 mm/hour), rain at a rate of less than a light rain threshold (e.g., 12.7 mm/hour), rain at a rate between the light rain threshold and a heavy rain threshold (e.g., 12.7-25.4 mm/hour), rain at a rate of greater than the heavy rain threshold (e.g., 25.4 mm/hour), and/or the like. For each combination of the set of driving conditions, a mean, median, or mode of the identified sensor quality indices may be determined. For example, for the combination of rain at a rate less than a light rain threshold, four sensor quality indices (e.g., having values of 75%, 80%, 70%, and 75%) may be identified and it may be determined that the sensor quality index corresponding to the combination of rain at a rate less than a light rain threshold is 75%.

Continuing with FIG. 5, at block 518, one or more sensor quality index tables and/or driving condition tables are provided. For example, the network apparatus 10 may provide one or more sensor quality index tables and/or driving condition tables such that one or more vehicle apparatuses 30 receive at least one of the one or more sensor quality index tables and/or driving condition tables. For example, the network apparatus 10 may comprise means, such as processor 12, memory 14, communications interface 16, and/or the like for providing one or more sensor quality index tables and/or driving condition tables such that one or more vehicle apparatuses receive at least one of the one or more sensor quality index tables and/or driving condition tables.

In an example embodiment, one or more sensor quality index tables and/or driving condition tables may be integrated into a digital map and/or one or more tiles of a digital map. For example, the digital map and/or one or more tiles of the digital map may comprise a map layer comprising sensor quality index tables and/or driving condition tables. For example, a driving condition index table (and/or a reference thereto) corresponding to a first TME may be added to a data record corresponding to the first TME of the digital map. For example, a network apparatus 10 may update a geographic database of a digital map and/or one or more map tiles of the digital map to include one or more sensor quality index tables and/or driving condition tables. The network apparatus 10 may then provide the geographic database, digital map, and/or one or more map tiles of the digital map such that one or more vehicle apparatuses 30 receive the geographic database, digital map, and/or one or more map tiles of the digital map. In various embodiments, the geographic database, digital map, and/or one or more map tiles of the digital map comprise map information/data. The map information/data (including the sensor quality index table(s) and/or driving condition table(s)) are configured for use by a vehicle apparatus 30 when performing one or more navigation functions. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, a low sensor quality mitigation function, and/or the like.

c. Exemplary Operation of a Vehicle Apparatus

In various embodiments, a vehicle apparatus 30 onboard a vehicle 5 receives one or more sensor quality index tables and/or driving condition tables. In an example embodiment, the vehicle apparatus 30 receives one or more sensor quality index tables and/or driving conditions tables as part of a geographic database, digital map, tile of a digital map, and/or the like. The vehicle apparatus 30 may determine and/or receive a planned route from an origin location to a destination location. The vehicle apparatus 30 may then use one or more sensor quality index tables and/or driving condition tables to determine if the expected sensor quality (e.g., effectiveness and/or usability of sensor data captured by a sensor) of one or more sensors 39 onboard the vehicle 5, as determined based on one or more sensor quality index tables and/or driving condition tables, are acceptable along the entirety of the planned route. In an example embodiment, a determination of whether the expected sensor quality is acceptable includes the accessing of current and/or expected driving conditions for at least a portion of the planned route. If the expected sensor quality of the one or more sensors 39 is acceptable along the entirety of the planned route, the vehicle apparatus 30 may proceed to control the vehicle along the planned route (e.g., in an automated, self-driving and/or assisted driving manner) and/or to guide a human operator of the vehicle 5 along the planned route. If the expected sensor quality is not acceptable along one or more TMEs of the planned route, the vehicle apparatus 30 may perform a low sensor quality mitigation function. In various embodiments, a low sensor quality mitigation function is a function that mitigates the effects of the expected low usability of sensor information/data of a sensor 39 along one or more TMEs on the vehicle's 5 ability to navigate a route. In various embodiments, a slow sensor quality mitigation function is a function that improves the efficiency with which a vehicle 5 may traverse a route from an origin location to a destination location when one or more sensors 39 onboard the vehicle are expected to have low usability for at least one TME of at least one route between the origin location and the destination location. In various embodiments, a low sensor quality mitigation function may comprise determining a new route from the origin location to the destination location wherein the entirety of the new route (and/or a larger portion of the new route compared to the planned route) has expected sensor effectiveness and/or usability that is acceptable (e.g., satisfies the threshold requirement); determining a modified sensor usage plan (e.g., adjusting one or more weights assigned to sensor information/data captured by one or more sensors onboard the vehicle in one or more algorithms that use sensor information/data to perform navigation functions) for one or more portions of the route (e.g., the planned route or a new route); identify a human operator assistance portion of a route (e.g., the planned route or a new route); activate one or more secondary sensors for one or more portions of the route (e.g., the planned route or a new route); and/or the like.

FIG. 9 provides a flowchart illustrating operations performed, such as by the vehicle apparatus 30 to use sensor quality index table(s) and/or driving condition table(s) to perform a navigation function, in accordance with an example embodiment. Starting at block 902, the vehicle apparatus 30 receives one or more sensor quality index tables and/or driving condition tables. For example, the vehicle apparatus 30 may comprise means, such as processor 32, memory 34, communication interface 36, and/or the like for receiving one or more sensor quality index tables and/or driving condition tables. For example, a network apparatus 10 may provide one or more sensor quality index tables and/or driving condition tables such that the vehicle apparatus 30 receives the one or more sensor quality index tables and/or driving condition tables. In various embodiments, the one or more sensor quality index tables and/or driving condition tables are received as part of a geographic database, digital map, and/or one or more tiles of a digital map. In various embodiments, the vehicle apparatus 30 may store the one or more sensor quality index tables and/or driving condition tables (e.g., as part of the geographic database, digital map, and/or one or more tiles of the digital map) in memory 34.

At block 904, responsive to determining and/or receiving a planned route, current and/or expected driving condition information/data describing the current and/or expected driving conditions along at least a portion of the planned route is accessed. In an example embodiment, the planned route comprises an origin location, a destination location, a traversable route from the origin location to the destination location, a start time, an expected arrival time, and/or the like. In an example embodiment, the planned route is received prior to the vehicle beginning to traverse a route from the origin location to the destination location. In an example embodiment, the planned route may be reroute provided and/or determined in response to changing traffic conditions, changing weather conditions, user input, and/or the like. For example, the vehicle apparatus 30 may receive a planned route (e.g., provided by a network apparatus 10 and/or the like) and/or may determine a planned route (possibly based on user input received via a user interface 38 of the vehicle apparatus 30 and/or based on predicted trip of the vehicle 5). The vehicle apparatus 30 may determine current and/or expected driving conditions (e.g., may request and receive and/or otherwise access, possibly via an information apparatus 40) along at least a portion of the planned route. For example, the vehicle apparatus 30 may comprise means, such as processor 32, memory 34, and/or communication interface 36, for determining (e.g., requesting and receiving and/or otherwise accessing, possibly via an information apparatus 40) current and/or expected driving condition information/data corresponding to current and/or expected driving conditions along at least a portion of the planned route. For example, the driving conditions currently being experienced along one or more TMEs of the planned route and/or expected to be experienced along one or more TMEs of the planned route at a time the vehicle 5 is expected to traverse the one or more TMEs (in accordance with the planned route) may be accessed.

At block 906, one or more sensor quality index tables and/or driving condition tables may be accessed based on the one or more sensors 39 onboard the vehicle 5 and the planned route. For example, the vehicle apparatus 30 may access one or more sensor quality index tables and/or driving condition tables. For example, the vehicle apparatus 30 may comprise means, such as processor 32, memory 34, and/or the like, for accessing (e.g. from memory 34) one or more sensor quality index tables and/or driving condition tables. For example, sensor quality index tables and/or driving condition tables corresponding to TMEs and/or epochs corresponding to TMEs to be traveled along the planned route and/or the expected departure time, arrival time, and/or other time of the planned route may be accessed. For example, sensor quality index tables and/or driving condition tables corresponding to TMEs and/or epochs corresponding sensor types (as identified by the sensor IDs) that correspond to one or more sensors 39 onboard the vehicle 5. The vehicle apparatus 30 may then evaluate the planned route based at least in part on the one or more sensor quality index tables and/or driving condition tables may be accessed. The expected usability of one or more sensors 39 onboard the vehicle 5 may then be determined for the planned route and/or at least a portion of the planned route (e.g., along one or more TMEs and/or during one or more time periods of the planned route) based on the accessed sensor quality index tables and/or driving condition tables and the determined current and/or expected driving conditions.

At block 908, it is determined if the expected usability of the one or more sensors 39 onboard the vehicle 5 is acceptable. For example, the expected usability of a sensor 39 onboard the vehicle 5 may be acceptable if the expected usability satisfies a quality threshold requirement (e.g., is greater than a quality threshold). In an example embodiment, the expected usability of a sensor 39 onboard the vehicle 5 is acceptable if a combination of the expected usability of two or more sensors 39 onboard the vehicle 5 satisfy a quality threshold requirement. In an example embodiment, the quality threshold requirement may be dependent on the sensor type, the particular combination of sensors considered, the configuration of sensors 39 onboard the vehicle 5, and/or the like. For example, for a first sensor configuration that is not highly dependent on an imaging sensor (e.g., camera), the quality threshold requirement may indicate that the expected usability of the imaging sensor should be at 60%, while for a second sensor configuration that is more dependent on an imaging sensor, the quality threshold requirement may indicate that the expected usability of the imaging sensor should be at least 80%. For example, the vehicle apparatus 30 may determine if the expected usability of one or more sensors 39 onboard the vehicle 5 satisfy a quality threshold requirement (e.g., meet or exceed a quality threshold). For example, the vehicle apparatus 30 may comprise means, such as processor 32, memory 34, and/or the like, for determining if the expected usability of one or more sensors 39 onboard the vehicle 5 satisfy a quality threshold requirement (e.g., meet or exceed a quality threshold).

If, at block 908, it is determined that the expected usability of the one or more sensors 39 satisfy the quality threshold requirement for the entire planned route, the process continues to block 910. At block 910, the vehicle apparatus 30 controls the vehicle 5 along the planned route, assists in the control of the vehicle 5 along the planned route, and/or provides (e.g., via a user interface 38) guidance to a human operator of the vehicle 5 to guide the vehicle 5 along the planned route. For example, the vehicle apparatus 30 may comprise means, such as processor 32, memory 34, communication interface 36, user interface 38 and/or the like, for controlling the vehicle 5 along the planned route, assisting in the control of the vehicle 5 along the planned route, and/or providing guidance to a human operator of the vehicle 5 to guide the vehicle 5 along the planned route.

If, at block 908, it is determined that the expected usability of at least one sensor 39 does not satisfy the quality threshold requirement for at least one TME (or sub-TME) of the planned route, one or more low sensor quality mitigation functions are performed. Various examples of low sensor quality mitigation functions are determining a new route from the origin location to the destination location wherein the entirety of the new route (and/or a larger portion of the new route compared to the planned route) has expected sensor effectiveness and/or usability that is acceptable (e.g., satisfies the threshold requirement); determining a modified sensor usage plan (e.g., adjusting one or more weights assigned to sensor information/data captured by one or more sensors onboard the vehicle in one or more algorithms that use sensor information/data to perform navigation functions) for one or more portions of the route (e.g., the planned route or a new route); identifying a human operator assistance portion of a route (e.g., the planned route or a new route); activating one or more secondary sensors for a portion of a route (e.g., the planned route or a new route); and/or the like.

For example, at block 912, a new route having a better expected usability of one or more sensors 39 (compared to the planned route) may be determined. For example, the vehicle apparatus 30 may determine a new route having better expected usability of one or more sensors 39 (compared to the planned route). For example, the vehicle apparatus 30 may comprise means, such as processor 32, memory 34, and/or the like for determining a new route that has a better expected usability of at least one sensor 39 (compared to the planned route). For example, one or more TMEs of the planned route may be replaced with one or more other TMEs having better expected usability of one or more sensors 39 (compared to at least one of the one or more TMEs of the planned route that are being replaced). For example, the expected usability of one or more sensors 39 along the new route may be acceptable (e.g., satisfy a quality threshold requirement) along the entirety of the new route, in an example embodiment.

For example at block 914, the usage of one or more sensors 39 may be modified along at least one TME of the route (e.g., a new route and/or the planned route). For example, if a first sensor has a low expected usability along one or more TMEs of the route (e.g., a new route and/or the planned route), but a second sensor has an acceptable expected usability along the same one or more TMEs of the route, the second sensor may be relied more heavily on those one or more TMEs of the route (and/or the entire route) than usual. For example, an algorithm used by the vehicle apparatus 30 to make decisions and/or perform one or more navigation functions may be altered and/or modified based on which sensors 39 have an acceptable expected usability along the route (e.g., a new route and/or the planned route) and/or a portion thereof. For example, the algorithm may be altered and/or modified by changing one or more weights of the algorithm that correspond to one or more sensors. For example, the vehicle apparatus 30 may modify the usage of one or more sensors 39 along at least one TME of the route (e.g., new route and/or planned route) to take advantage of one or more sensors 39 that have acceptable expected usability (e.g., the expected usability satisfies a quality threshold requirement) along the at least one TME. For example, the vehicle apparatus 30 may comprise means, such as processor 32, memory 34, sensors 39, and/or the like, for modifying the usage of one or more sensors 39 along at least one TME of the route (e.g., new route and/or planned route) to take advantage of one or more sensors 39 that have acceptable expected usability (e.g., the expected usability satisfies a quality threshold requirement) along the at least one TME.

At block 916, one or more human operator assistance portions of a route (e.g., a new route or the planned route) may be identified. For example, a portion of a route may be identified as a human operator assistance portion if the expected usability of one or more sensors 39 along one or more TMEs of the portion of the route does not satisfy a quality threshold requirement. In an example embodiment, a human operator may be notified that the route includes at least human operator assistance portion across which the human operator will be expected to control the vehicle 5. In various embodiments, a human operator of the vehicle may be provided with a notification that the vehicle is approaching the human operator assistance portion of the route prior to the vehicle reaching the human operator assistance portion (e.g., one minute, five minutes, ten minutes, fifteen minutes, quarter of a mile, half a mile, one mile, five miles, half a kilometer, a kilometer, five kilometers, ten kilometers, fifteen kilometers, and/or the like before the vehicle reaches the human operator assistance portion). The vehicle apparatus may then transfer control of the vehicle to the human operator through the human operator assistance portion of the route and, in an example embodiment, offer to and/or to automatically resume control and/or assisting to control the vehicle once the vehicle exits and/or completes the human operator assistance portion of the route. Thus, by identifying a human operator assistance portion of a route based on the expected usability of one or more sensors before beginning a route and/or before the vehicle 5 reaches the human operator assistance portion of the route, the human operator can be prepared to take control of the vehicle 5 when the vehicle 5 does reach the human operator assistance portion of the route or may choose to not take the trip. For example, the vehicle apparatus 30 may identify one or more human operator assistance portions of a route, provide notification to the human operator that control of the vehicle 5 will be transferred to the human operator prior to the vehicle 5 reaching the human operator assistance portion, and transfer the control of the vehicle to the human operator when the human operator assistance portion is reached. For example, the vehicle apparatus 30 may comprise means, such as processor 32, memory 34, user interface 38, and/or the like, for identifying one or more human operator assistance portions of a route, providing a notification to the human operator that control of the vehicle 5 will be transferred to the human operator prior to the vehicle 5 reaching the human operator assistance portion, and transferring the control of the vehicle to the human operator when the human operator assistance portion is reached.

At block 918, one or more secondary sensors of the one or more sensors 39 may be activated. For example, a low sensor quality mitigation function may comprise activating one or more secondary sensors of the one or more sensors 39 along one or more TMEs of the route (e.g., the planned route or a new route) along which the expected sensor quality is unacceptable (e.g., does not satisfy a quality threshold requirement). For example, a vehicle apparatus 30 may activate one or more secondary sensors of the one or more sensors 39 onboard the vehicle 5 along one or more TMEs of the route. For example, the vehicle apparatus 30 may comprise means, such as processor 32, memory 34, communication interface 36, sensors 39, and/or the like, for activating one or more secondary sensors of the one or more sensors 39. In an example embodiment, a secondary sensor is a different type of sensor (e.g., different category of sensor, different brand/model of sensor, a differently positioned sensor, and/or the like) from the sensor having an unacceptable expected sensor quality (e.g., an expected sensor quality that does not satisfy the quality threshold requirement). In an example embodiment, a secondary sensor is a more advanced sensor than the sensor having an unacceptable expected sensor quality (e.g., an expected sensor quality that does not satisfy the quality threshold requirement). In an example embodiment, a secondary sensor may be a modification of the sensor having an unacceptable expected sensor quality (e.g., an expected sensor quality that does not satisfy the quality threshold requirement). For example, if it is expected that a sun glare will be present along a particular TME of a route, a secondary sensor may be activated by causing a filter (e.g., a polarized filter, a partial light blocking filter, and/or the like) to be positioned over the aperture of an optical camera. In an example embodiment, one or more secondary sensors may be activated for the entire route (e.g., the planned route or a new route). In an example embodiment, the one or more secondary sensors may be activated when a TME is reached where the expected sensor quality of one or more sensors does not satisfy a corresponding quality threshold requirement and the one or more secondary sensors may be deactivated upon reaching a TME of the route where the expected sensor quality of the one or more sensors does satisfy the corresponding quality threshold requirement. In various embodiments, the use of a secondary sensor and the modifying of sensor usage (e.g., the changing of one or more weights of an algorithm that uses sensor information/data as input) may be performed in concert.

Various other low sensor quality mitigation functions and/or combinations of determining a new route, determining a modified sensor usage plan, and a human operator assistance portion and/or other low sensor quality mitigation functions may be used, in various embodiments. For example, the vehicle apparatus 30 may be configured to use one or more low sensor quality mitigation functions based on a variety of factors (e.g., the sensor configuration onboard the vehicle 5, the percentage of the planned route where the expected usability of one or more sensors does not satisfy a quality threshold requirement, and/or the like).

Technical Advantages

Various embodiments of the present invention provide methods, apparatuses, systems, computer program products, and/or the like for identifying and mitigating situations wherein various sensors may be technically working properly, but due to driving conditions under which the various sensors are capturing sensor information/data, the various sensors are not functioning effectively. In particular, one or more TMEs of a route (e.g., a planned route or a new route) may be identified as TMEs where the expected usability of one or more sensors 39 onboard a vehicle 5 is too low for use by the vehicle apparatus 30 (e.g., when operating in a normal operation mode) prior to the vehicle 5 reading the one or more TMEs and/or before beginning to traverse the route. Thus, a vehicle apparatus 30 may perform one or lower sensor quality mitigation functions to mitigate the effect of the low usability of one or more sensors due to various driving conditions. For example, particular TMEs that have expected low usability of sensor information/data captured by one or more sensors may be avoided, the usage of one or more sensors may be modified to leverage sensors expected to have good usability (e.g., expected usability that satisfies a quality threshold), to provide ample warning to a human operator of the vehicle 5 when human operator assistance will be needed, and/or the like.

As should be understood, automated self-driving vehicles and ADAS are highly dependent on sensors onboard the vehicle to efficiently control the vehicle. Thus, being able to identifying areas (e.g., TMEs) where one or more sensors onboard the vehicle are expected to have low quality and/or to not provide sensor information/data of a usable quality, allows for more efficient operation of the vehicle 5. For example, one or more low sensor quality mitigation functions may be performed prior to the beginning of a route, while a vehicle traverses a route, and/or the like to ensure efficient operation of the vehicle 5. Moreover, the determination of TMEs that are expected to have low usability of sensor information/data captured by one or more sensors may be determined based on the TME itself; a time of day, day of the week, and/or day of the year; the types, specific sensors, and/or sensor configurations of sensors onboard the vehicle 5; and the degree to which various dynamic factors are affecting the driving conditions that the vehicle 5 will be and/or is expected to be operating under. For example, the driving conditions may include weather conditions, traffic conditions, road position, and/or the like. By taking into account the degree to which various weather conditions, traffic conditions, road positions, and/or the like affect the usability of sensor information/data captured by various sensor types, a more accurate prediction of which portions of a route are expected to have low usability of sensor information/data captured by one or more sensors and/or for which one or more low sensor quality mitigation functions should be performed may be made. Thus, various embodiments provide improvements in the technological fields of automated driving, assisted driving, guiding a human operator of a vehicle along a route, route determination, lane-level route determination, route guidance, lane-level route guidance, and/or the performance of various navigation functions by a vehicle apparatus 30 onboard a vehicle 5.

III. Example Apparatus

The network apparatus 10, probe apparatus 20, vehicle apparatus 30, and/or informant apparatus 40 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10, probe apparatus 20, vehicle apparatus 30, and/or informant apparatus 40, may be embodied in other types of computing devices, such as a server, a personal computer, a computer workstation, a laptop computer, a plurality of networked computing devices or the like, that are configured to update one or more map tiles, analyze probe points for route planning or other purposes, store and/or provide driving condition information/data, generate and provide sensor quality index tables and/or driving condition tables, and/or the like. In an example embodiment, a probe apparatus 20, and/or vehicle apparatus 30 is an in-vehicle navigation system onboard a vehicle 5 or a mobile device and a network apparatus 10 and/or an informant apparatus 40 is a server. In an example embodiment, a probe apparatus 20 is an apparatus configured to capture sensor information/data via one or more sensors onboard the corresponding vehicle 5. In this regard, FIG. 2A depicts an example network apparatus 10, FIG. 2B depicts an example probe apparatus 20, and FIG. 2C depicts an example vehicle apparatus 30 that may be embodied by various computing devices including those identified above. In various embodiments, an informant apparatus 40 comprises similar components as those shown in the example network apparatus 10 of FIG. 2A. As shown, the network apparatus 10 of an example embodiment may include, may be associated with, or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment, a vehicle apparatus 30 of an example embodiment may include, may be associated with, or may otherwise be in communication with a processor 32 and a memory device 34 and optionally a communication interface 36, a user interface 38, one or more sensors 39 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment, an informant apparatus 40 may include, may be associated with, or may otherwise be in communication with a processor and a memory device and optionally a communication interface, a user interface, and/or other components configured to perform various operations, procedures, functions, or the like described herein.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, probe apparatus 20, vehicle apparatus 30, and/or informant apparatus 40 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, probe apparatus 20, vehicle apparatus 30, and/or informant apparatus 40 may include a user interface 18, 28, 38 that may, in turn, be in communication with the processor 12, 22, 32 to provide output to the user, such as one or more routes through a road network, a notification that a vehicle is approaching a human operator assistance portion of a route, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The network apparatus 10, probe apparatus 20, vehicle apparatus 30, and/or informant apparatus 40 may optionally include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, probe apparatus 20, vehicle apparatus 30, and/or informant apparatus 40 of an example embodiment, a navigation system may also include or have access to a geographic database. For example, in various embodiments, a network apparatus 10, probe apparatus 20, vehicle apparatus 30, and/or informant apparatus 40 may comprise a component (e.g., memory 14, 24, 34, and/or another component) that stores a digital map (e.g., in the form of a geographic database) comprising a first plurality of data records, each of the first plurality of data records representing a corresponding traversable map element, wherein at least some of said first plurality of data records include at least one sensor quality index table. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, link, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to TMEs, links, lanes, road segments, travel lanes of road segments, nodes, intersection, and/or the like and/or the corresponding data records (e.g., to add or update a corresponding sensor quality index table), one or more driving condition tables, a localization layer (e.g., comprising localization features) and/or the corresponding data records, and/or the like.

In an example embodiment, the TME data records are links, lanes, or segments, e.g., maneuvers of a maneuver graph, representing roads, travel lanes of roads, streets, or paths, as can be used in the calculated route or recorded route information for determination of one or more personalized routes. The intersection data records are end points corresponding to the respective links or segments of the road segment data records. The TME data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The TMEs, road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, probe apparatus 20, vehicle apparatus 30, and/or informant apparatus 40 in accordance with an example embodiment may determine the time to traverse a route that includes one or more turns at respective intersections more accurately.

IV. Apparatus, Methods, and Computer Program Products

As described above, FIGS. 3, 5, and 9 illustrate flowcharts of a network apparatus 10 probe apparatus 20, and/or vehicle apparatus 30, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor, a communications interface configured for communicating via at least one network, and at least one memory storing computer program code, the at least one memory and the computer program code configured to, with the processor, cause the apparatus to at least:
   receive a plurality of sensor quality communications, each sensor quality communication comprising a location, a timestamp, and a sensor quality metric;
   partition the sensor quality metrics of each of the plurality of sensor quality communications into groups based on respective traversable map elements (TMEs) corresponding to the respective locations and respective timestamps of the sensor quality communications;
   for at least a first group of the groups, determine at least one offset point along a respective TME corresponding to the first group based at least in part on processing the sensor quality metrics of the first group, the at least one offset point defining at least two sub-TMEs of the respective TME;
   determine respective sensor quality indexes for each of the at least two sub-TMEs based on the corresponding sensor quality metrics;
   associate the respective sensor quality indexes with (a) a respective one of the at least two-sub TMEs and (b) an epoch based on the corresponding timestamps;
   generate or update a sensor quality index table based at least in part on the respective sensor quality indexes associated with the respective one of the at least two-sub TMEs and epoch; and
   provide the sensor quality index table such that at least one vehicle apparatus receives the sensor quality index table, wherein the at least one vehicle apparatus is configured to perform at least one navigation function based at least in part on the sensor quality index table.

2. The apparatus of claim 1, wherein the at least one memory and the computer program code are further configured to, with the processor, cause the apparatus to at least determine driving conditions corresponding to each group, wherein the sensor quality index table provides driving conditions corresponding to the sensor quality index of each group.

3. The apparatus of claim 2, wherein the driving conditions comprise weather information comprising at least one of precipitation type, precipitation rate, cloud cover, visibility, obstructions to visibility, temperature, humidity, cloud ceiling, or part of day indicator corresponding to the TME during the epoch.

4. The apparatus of claim 2, wherein the driving conditions comprise traffic information comprising at least one of a traffic volume, representative speed, or free flow ratio along the TME during the epoch.

5. The apparatus of claim 1, wherein the at least one memory and the computer program code are further configured to, with the processor, cause the apparatus to at least:
determine a sensor quality metric distribution for at least one group, the at least one group corresponding to a first TME and first epoch;
determine whether the sensor quality metric distribution is unimodal;
responsive to determining that the sensor quality metric distribution is unimodal, determine a sensor quality index corresponding to an entire length of the first TME; and
responsive to determining that the sensor quality metric distribution is not unimodal:
determine one or more offset points along the first TME that define two or more sub-TMEs, each sub-TME corresponding to a unimodal sensor quality metric distribution, and
determine a sensor quality index corresponding to each sub-TME, wherein the sensor quality index table is generated or updated to include the sensor quality index corresponding to each sub-TME for the first epoch.

6. The apparatus of claim 1, wherein the at least one memory and the computer program code are further configured to, with the processor, cause the apparatus to at least:
aggregate one or more sensor quality index tables based on driving conditions to generate one or more driving condition tables; and
provide at least one of the one or more driving condition tables such that the at least one vehicle apparatus receives the at least one of the one or more driving condition tables, wherein the at least one vehicle apparatus is configured to use the at least one of the one or more driving condition tables to perform one or more navigation functions.

7. A component of an apparatus, the component comprising a non-transitory computer-readable medium, the component comprising:
a digital map stored on the computer-readable medium, the digital map comprising a first plurality of data records, each of said first plurality of data records representing a respective corresponding traversable map element (TME),
wherein at least some of said first plurality of data records further comprise:
at least one sensor quality index table, said at least one sensor quality index table providing a sensor quality index for at least one sensor type for each of a plurality of driving conditions, wherein a vehicle comprises a sensor of the at least one sensor type and the sensor quality index indicates an expected sensor effectiveness of the sensor of the at least one sensor type under a corresponding driving condition of the plurality of driving conditions, wherein, in association with at least one driving condition, at least two sub-TMEs are defined with each sub-TME associated with a respective sensor quality index, and
wherein the at least one sensor quality index table is configured to be used by the apparatus to perform at least one navigation function for the vehicle.

8. The component of claim 7, wherein the plurality of driving conditions comprise at least one of precipitation type, a precipitation rate, visibility, obstructions to visibility, cloud cover, cloud ceiling, humidity, or temperature.

9. The component of claim 7, wherein at least some of the plurality of driving conditions correspond to a date or a period of time.

10. The component of claim 7, wherein the plurality of driving conditions comprise traffic conditions.

11. The component of claim 7, wherein the plurality of driving conditions correspond to a degree factor of a particular driving condition.

12. The component of claim 7, wherein the digital map further comprises at least one driving condition table providing provides a sensor quality index corresponding to expected sensor effectiveness of a sensor corresponding to a sensor type under an indicated combination of driving conditions.

13. The apparatus of claim 1, wherein performing the at least one navigation function comprises at least one of (a) determining or requesting a new route that is different from a planned route, (b) modifying usage of at least one sensor associated with the vehicle apparatus along at least a portion of the planned route, or (c) identifying at least one human operator assistance portion of the planned route.

14. An apparatus comprising at least one processor, a communications interface configured for communicating via at least one network, and at least one memory storing computer program code, the at least one memory and the computer program code configured to, with the processor, cause the apparatus to at least:
receive a plurality of sensor quality communications, each sensor quality communication comprising a location, a timestamp, and a sensor quality metric;
partition the sensor quality metrics of each of the plurality of sensor quality communications into groups based on respective traversable map elements (TMEs) corresponding to the respective locations and respective timestamps of the sensor quality communications;
determine a sensor quality metric distribution for at least one group, the at least one group corresponding to a first TME and first epoch;
determine whether the sensor quality metric distribution is unimodal;
responsive to determining that the sensor quality metric distribution is unimodal, determine a sensor quality index corresponding to an entire length of the first TME;
responsive to determining that the sensor quality metric distribution is not unimodal:
determine one or more offset points along the first TME that define two or more sub-TMEs, each sub-TME corresponding to a unimodal sensor quality metric distribution, and determine a sensor quality index corresponding to each sub-TME, wherein the sensor quality index table is generated or updated to include the sensor quality index corresponding to each sub-TME for the first epoch;

generate or update a sensor quality index table based at least in part on the first epoch and one of (a) the sensor quality index corresponding to the entire length of the first TME or (b) the respective sensor quality indexes corresponding to the respective sub-TMEs of the first TME; and provide the sensor quality index table such that at least one vehicle apparatus receives the sensor quality index table, wherein the at least one vehicle apparatus is configured to perform at least one navigation function based at least in part on the sensor quality index table.

15. The apparatus of claim 14, wherein the one or more offset points are defined to separate statistically significantly different distributions of sensor quality metrics based on the respective locations.

16. The apparatus of claim 14, wherein the at least one memory and the computer program code are further configured to, with the processor, cause the apparatus to at least determine driving conditions corresponding to each group, wherein the sensor quality index table provides driving conditions corresponding to the sensor quality index of each group.

17. The apparatus of claim 16, wherein the driving conditions comprise weather information comprising at least one of precipitation type, precipitation rate, cloud cover, visibility, obstructions to visibility, temperature, humidity, cloud ceiling, or part of day indicator corresponding to the TME during the epoch.

18. The apparatus of claim 16, wherein the driving conditions comprise traffic information comprising at least one of a traffic volume, representative speed, or free flow ratio along the TME during the epoch.

19. The apparatus of claim 14, wherein the at least one memory and the computer program code are further configured to, with the processor, cause the apparatus to at least:

aggregate one or more sensor quality index tables based on driving conditions to generate one or more driving condition tables; and provide at least one of the one or more driving condition tables such that the at least one vehicle apparatus receives the at least one of the one or more driving condition tables, wherein the at least one vehicle apparatus is configured to use the at least one of the one or more driving condition tables to perform one or more navigation functions.

20. The apparatus of claim 14, wherein the sensor quality index table is stored as part of a digital map.

* * * * *

UNITED STATES PATENT AND TRADEMARK OFFICE
CERTIFICATE OF CORRECTION

| | | |
|---|---|---|
| PATENT NO. | : 11,340,077 B2 | |
| APPLICATION NO. | : 16/367746 | |
| DATED | : May 24, 2022 | |
| INVENTOR(S) | : Jeremy M. Young et al. | |

It is certified that error appears in the above-identified patent and that said Letters Patent is hereby corrected as shown below:

In the Claims

In Column 48, Lines 27-28, Claim 12, delete "providing provides" and insert -- providing --, therefor.

Signed and Sealed this
Eighteenth Day of July, 2023

Katherine Kelly Vidal
*Director of the United States Patent and Trademark Office*